(12) United States Patent
Sood et al.

(10) Patent No.: US 10,642,972 B2
(45) Date of Patent: May 5, 2020

(54) EXTENDING PACKET PROCESSING TO TRUSTED PROGRAMMABLE AND FIXED-FUNCTION ACCELERATORS

(71) Applicants: Kapil Sood, Beaverton, OR (US); Somnath Chakrabarti, Portland, OR (US); Wei Shen, Hillsboro, OR (US); Carlos V. Rozas, Portland, OR (US); Mona Vij, Hillsboro, OR (US); Vincent R. Scarlata, Beaverton, OR (US)

(72) Inventors: Kapil Sood, Beaverton, OR (US); Somnath Chakrabarti, Portland, OR (US); Wei Shen, Hillsboro, OR (US); Carlos V. Rozas, Portland, OR (US); Mona Vij, Hillsboro, OR (US); Vincent R. Scarlata, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 648 days.

(21) Appl. No.: 15/298,419

(22) Filed: Oct. 20, 2016

(65) Prior Publication Data

US 2018/0114013 A1 Apr. 26, 2018

(51) Int. Cl.
*G06F 11/30* (2006.01)
*G06F 21/53* (2013.01)
(Continued)

(52) U.S. Cl.
CPC .......... *G06F 21/53* (2013.01); *G06F 9/45558* (2013.01); *G06F 21/44* (2013.01);
(Continued)

(58) Field of Classification Search
CPC ........ G06F 21/53; G06F 21/572; G06F 21/44; G06F 21/606; G06F 9/4558;
(Continued)

(56) References Cited

U.S. PATENT DOCUMENTS 9,584,517 B1* 2/2017 Roth ................... G06F 21/6209
2014/0258733 A1* 9/2014 Scott-Nash ......... G06F 12/1408
713/190

(Continued)

*Primary Examiner* — Samson B Lemma
(74) *Attorney, Agent, or Firm* — Law Office of R. Alan Burnett, P.S

(57) ABSTRACT

Methods and apparatus for extending packet processing to trusted programmable and fixed-function accelerators. Secure enclaves are created in system memory of a compute platform, wherein software code external from a secure enclave cannot access code or data within a secure enclave, and software code in a secure enclave can access code and data both within the secure enclave and external to the secure enclave. Software code for implementing packet processing operations is installed in the secure enclaves. The compute platform further includes one or more hardware-based accelerators that are used by the software to offload packet processing operations. The accelerators are configured to read packet data from input queues, process the data, and output processed data to output queues, wherein the input and output queues are located in encrypted portions of memory that may be in a secure enclave or external to the secure enclaves. Tokens are used by accelerators to validate access to memory in secure enclaves, and used by both accelerators and secure enclaves to access encrypted memory external to secure enclaves.

12 Claims, 23 Drawing Sheets

(51) Int. Cl.
  *G06F 21/57*   (2013.01)
  *G06F 21/44*   (2013.01)
  *G06F 9/455*   (2018.01)
  *G06F 21/60*   (2013.01)
  G06F 12/14    (2006.01)
  G06F 8/61     (2018.01)

(52) U.S. Cl.
  CPC .......... *G06F 21/572* (2013.01); *G06F 21/606* (2013.01); *G06F 8/61* (2013.01); *G06F 12/1408* (2013.01); *G06F 2009/45587* (2013.01); *G06F 2212/1052* (2013.01); *G06F 2212/152* (2013.01); *G06F 2212/402* (2013.01)

(58) Field of Classification Search
  CPC ....... G06F 2212/1052; G06F 2212/152; G06F 2212/402
  USPC ........................................................ 713/193
  See application file for complete search history.

(56) References Cited

U.S. PATENT DOCUMENTS

2014/0282935 A1* 9/2014 Lal .......................... G06F 21/72
                                                726/6
2015/0178226 A1* 6/2015 Scarlata .............. G06F 12/1466
                                                711/163
2015/0278514 A1* 10/2015 Kang ...................... G06F 21/60
                                                726/26
2016/0364723 A1* 12/2016 Reese ................. G06Q 20/202

\* cited by examiner

US 10,642,972 B2

EXTENDING PACKET PROCESSING TO TRUSTED PROGRAMMABLE AND FIXED-FUNCTION ACCELERATORS

BACKGROUND INFORMATION

During the past decade, there has been tremendous growth in the usage of so-called "cloud-hosted" services. Examples of such services include e-mail services provided by Microsoft (Hotmail/Outlook online), Google (Gmail) and Yahoo (Yahoo mail), productivity applications such as Microsoft Office 365 and Google Docs, and Web service platforms such as Amazon Web Services (AWS) and Elastic Compute Cloud (EC2) and Microsoft Azure. Cloud-hosted services are typically implemented using data centers that have a very large number of compute resources, implemented in racks of various types of servers, such as blade servers filled with server blades and/or modules and other types of server configurations (e.g., 1U, 2U, and 4U servers).

In recent years, virtualization of computer systems has seen rapid growth, particularly in server deployments and data centers. Under a conventional approach, a server runs a single instance of an operating system directly on physical hardware resources, such as the CPU, RAM, storage devices (e.g., hard disk), network controllers, I/O ports, etc. Under one virtualized approach using Virtual Machines (VMs), the physical hardware resources are employed to support corresponding instances of virtual resources, such that multiple VMs may run on the server's physical hardware resources, wherein each virtual machine includes its own CPU allocation, memory allocation, storage devices, network controllers, I/O ports etc. Multiple instances of the same or different operating systems then run on the multiple VMs. Moreover, through use of a virtual machine manager (VMM) or "hypervisor," the virtual resources can be dynamically allocated while the server is running, enabling VM instances to be added, shut down, or repurposed without requiring the server to be shut down. This provides greater flexibility for server utilization, and better use of server processing resources, especially for multi-core processors and/or multi-processor servers.

Under another virtualization approach, container-based OS virtualization is used that employs virtualized "containers" without use of a VMM or hypervisor. Instead of hosting separate instances of operating systems on respective VMs, container-based OS virtualization shares a single OS kernel across multiple containers, with separate instances of system and software libraries for each container. As with VMs, there are also virtual resources allocated to each container.

Deployment of Software Defined Networking (SDN) and Network Function Virtualization (NFV) has also seen rapid growth in the past few years. Under SDN, the system that makes decisions about where traffic is sent (the control plane) is decoupled for the underlying system that forwards traffic to the selected destination (the data plane). SDN concepts may be employed to facilitate network virtualization, enabling service providers to manage various aspects of their network services via software applications and APIs (Application Program Interfaces). Under NFV, by virtualizing network functions as software applications, network service providers can gain flexibility in network configuration, enabling significant benefits including optimization of available bandwidth, cost savings, and faster time to market for new services.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 11b is a diagram illustrating multiple packet processing flows implemented in parallel using packet processing operations executed within a trusted packet processing enclave;

DETAILED DESCRIPTION

Figure 1:
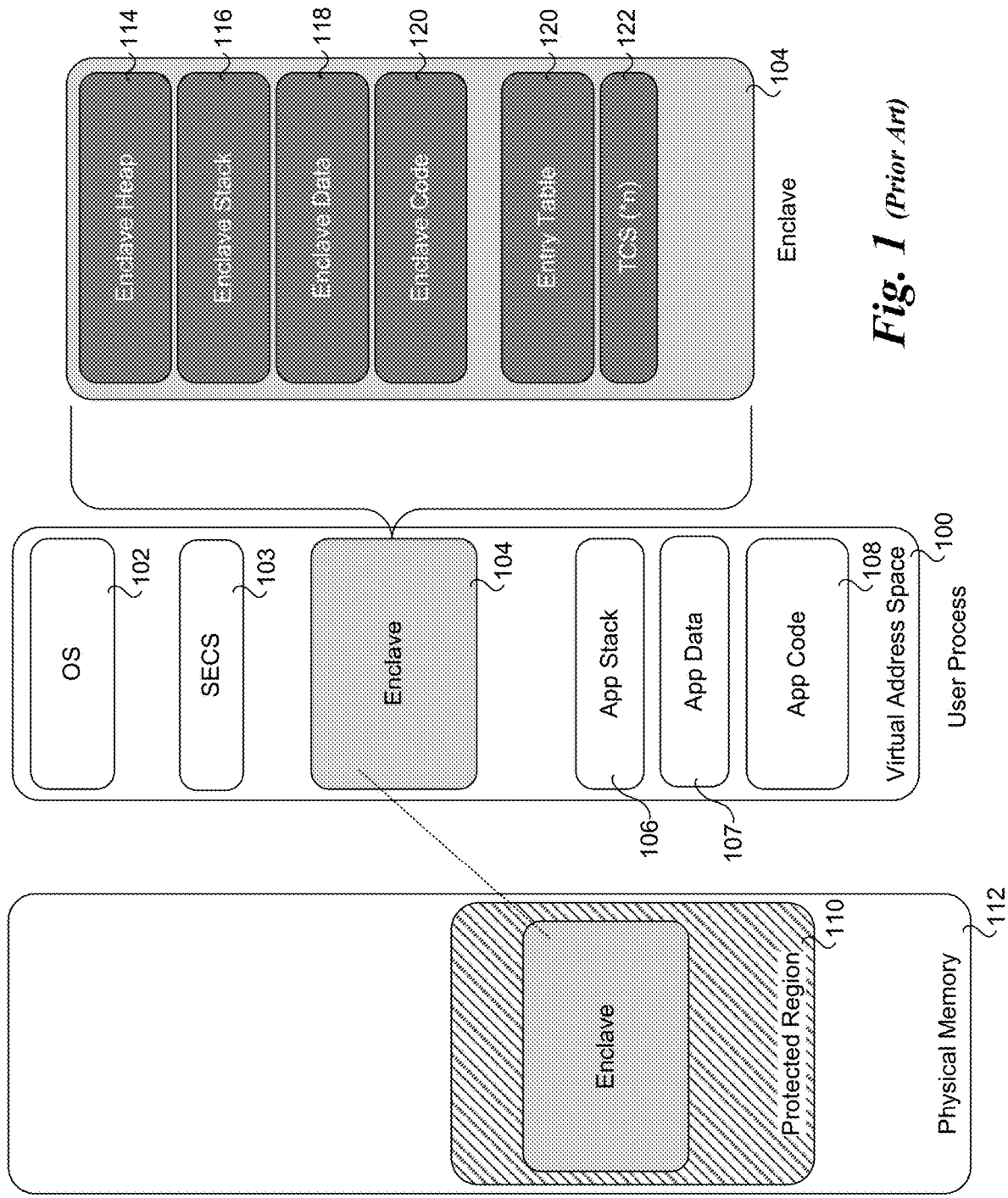
FIG. 1 is a schematic diagram illustrating the location of a secure enclave in physical and virtual memory, and an exemplary set of components for a secure enclave.

Embodiments of methods and apparatus for extending packet processing to trusted programmable and fixed-function accelerators are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Recently, INTEL® Corporation published documents describing the INTEL® Software Guard Extensions (INTEL® SGX), a set of instructions and mechanisms for memory accesses added to future INTEL® Architecture processors. INTEL® SGX can encompass two collections of instruction extensions, referred to as SGX1 and SGX2. The SGX1 extensions allow an application to instantiate a protected container, referred to as an enclave.

An enclave is a protected area in the application's address space (see FIG. 1), which provides confidentiality and integrity even in the presence of privileged malware. Accesses to the enclave memory area from any software not resident in the enclave are prevented. The SGX2 extensions allow additional flexibility in runtime management of enclave resources and thread execution within an enclave.

SGX when used in a server environment is a technology that is aimed at ensuring that users' applications hosted in the cloud are secure from inspection, corruption, etc. In order to have a better understanding of the implementation environments, a brief discussion of selected SGX features and architecture is now discussed.

SGX allows the protected portion of an application to be distributed in the clear. Before the enclave is built, the enclave code and data is free for inspection and analysis. During enclave creation, the enclave code and data is loaded from a clear-text source into an enclave where its code and data is measured. Code and data from an encrypted source may be installed into an enclave by first loading a trusted loader into the enclave. Once the enclave is running, the loader can then be used to install secret code/data into the enclave.

The SGX programming environment is a trusted execution environment embedded in a process. Once the application's code and data is loaded into an enclave, it is protected against all external software access. Each enclave has its own code and data for which the SGX programming environment provides confidentiality and integrity. The SGX programming environment further supports controlled entry points, and multiple execution threads, with full access to application memory, including any portion of application memory that is external to an enclave An application can prove its identity to a remote party and be securely provisioned with keys and credentials using attestation. The application can also request an enclave and platform-specific key that it can use to protect keys and data that it wishes to store outside the enclave.

FIG. 1 shows a memory layout of a platform's virtual address space 100 including an operating system (OS) 102, an enclave 104, a Secure Enclave Control Structure (SECS) 105, an application stack 106, application data 107, and application code 108. The enclave 104 virtual memory is mapped to a protected area 110 of physical memory 112. Enclave 104 is further depicted as including an enclave heap 114, an enclave stack 116, enclave data 118, enclave code 120, an entry table 120, and a set of pointers to Thread Control Structure pages (TCS(*n)) 122.

Figure 2:
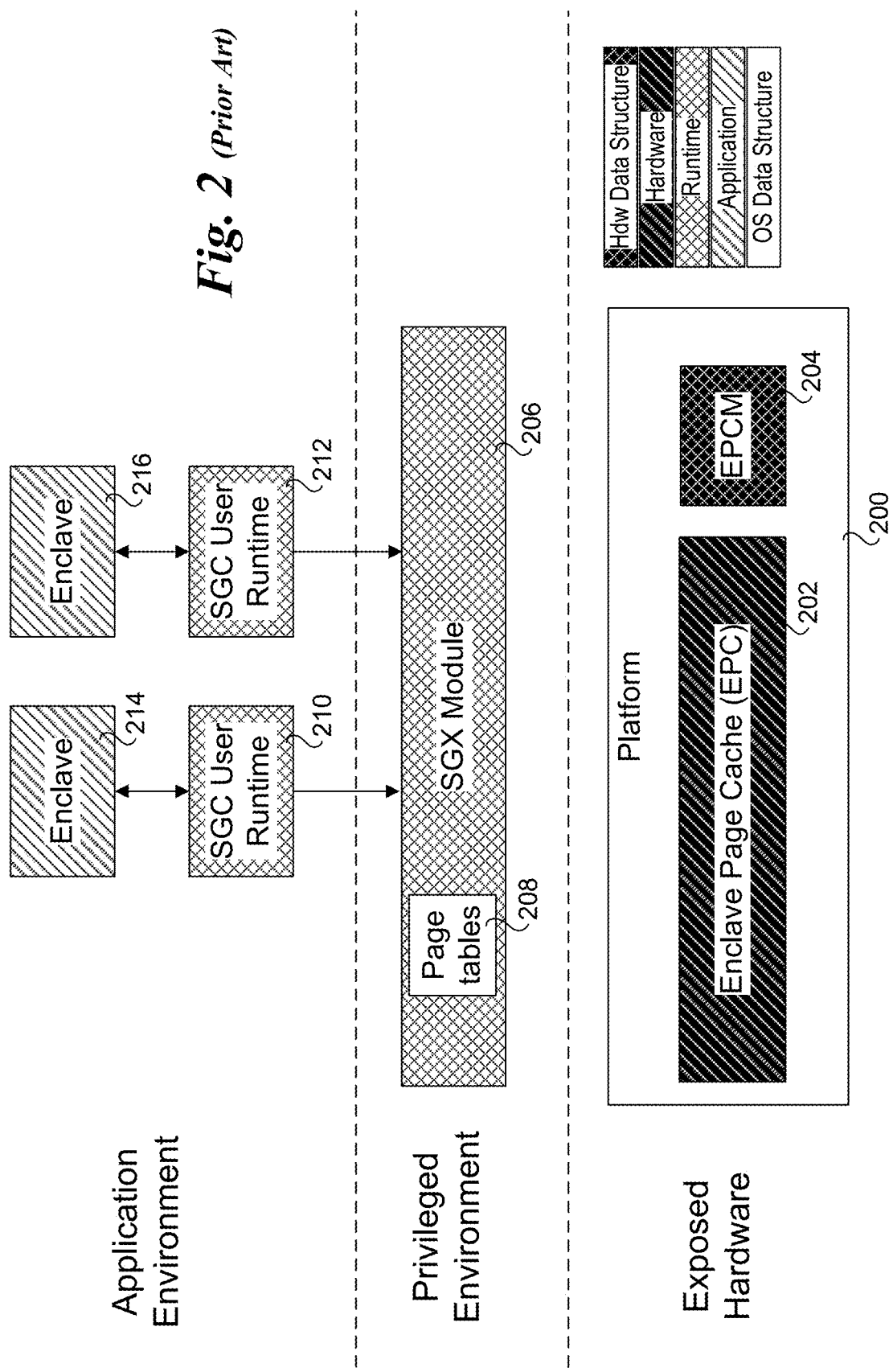
FIG. 2 is a schematic diagram illustrating a high-level SGX hardware and software architecture.

FIG. 2 shows a high-level SGX hardware and software architecture. The architecture includes an exposed hardware layer, a privileged environment layer, and an application environment layer. The exposed hardware on a platform 200 includes an Enclave Page Cache (EPC) 202, and an Enclave Page Cache Map (EPCM) 204. In one embodiment, EPC 202 contains protected code and data in 4K pages, while EPCM 204 contains meta-data for each enclave page. An SGX module 206 comprising a runtime component is depicted in the privileged environment layer, and includes page tables 208 that are implemented via corresponding page table data structures in the OS. The application environment layer includes SGC user runtime instances 210 and 212, and enclaves 214 and 216.

At a high level, a CPU that supports SGX and implements EPC in cryptographically protected platform DRAM supports the ability for the BIOS to reserve a range(s) of memory called Processor Reserved Memory (PRM). The BIOS allocates the PRM by configuring a set of range registers, collectively known as the PRMRR.

Use of main memory as storage for the EPC is very desirable for many implementations. The challenge is there are many known software and hardware attacks that can be waged on DRAM memory. Cryptographically protecting the EPC contents in DRAM is one way to defend against these attacks.

This is facilitated by a Memory Encryption Engine (MEE), which is a hardware unit that encrypts and integrity protects selected traffic between the processor package and the main memory (DRAM). The overall memory region that an MEE operates on is called an MEE Region. Depending on implementation, the PRM is covered by one or more MEE regions. Memory Access Semantics CPU memory protection mechanisms physically block access to PRM from all external agents (DMA, graphic engine, etc.), by treating such accesses as references to non-existent memory. To access a page inside an enclave using MOV and other memory related instructions, the hardware checks as described in FIG. 3, the following:

Logical processor is executing in "enclave mode"
Page belongs to enclave that the logical processor is executing
Page accessed using the correct virtual address If the accessed page is not part of the enclave's virtual address space but is part of the EPC then the access is treated as a reference to nonexistent memory. If the page is outside of the enclave virtual address space, then hardware allows the enclave code to access the memory outside of PRM. If the page is outside of the enclave's virtual address space and resolves into a PRM page, hardware prevents such access by signaling a fault. Accesses by a processor not in enclave mode to an enclave page are treated as a reference to nonexistent memory.

Figure 3:
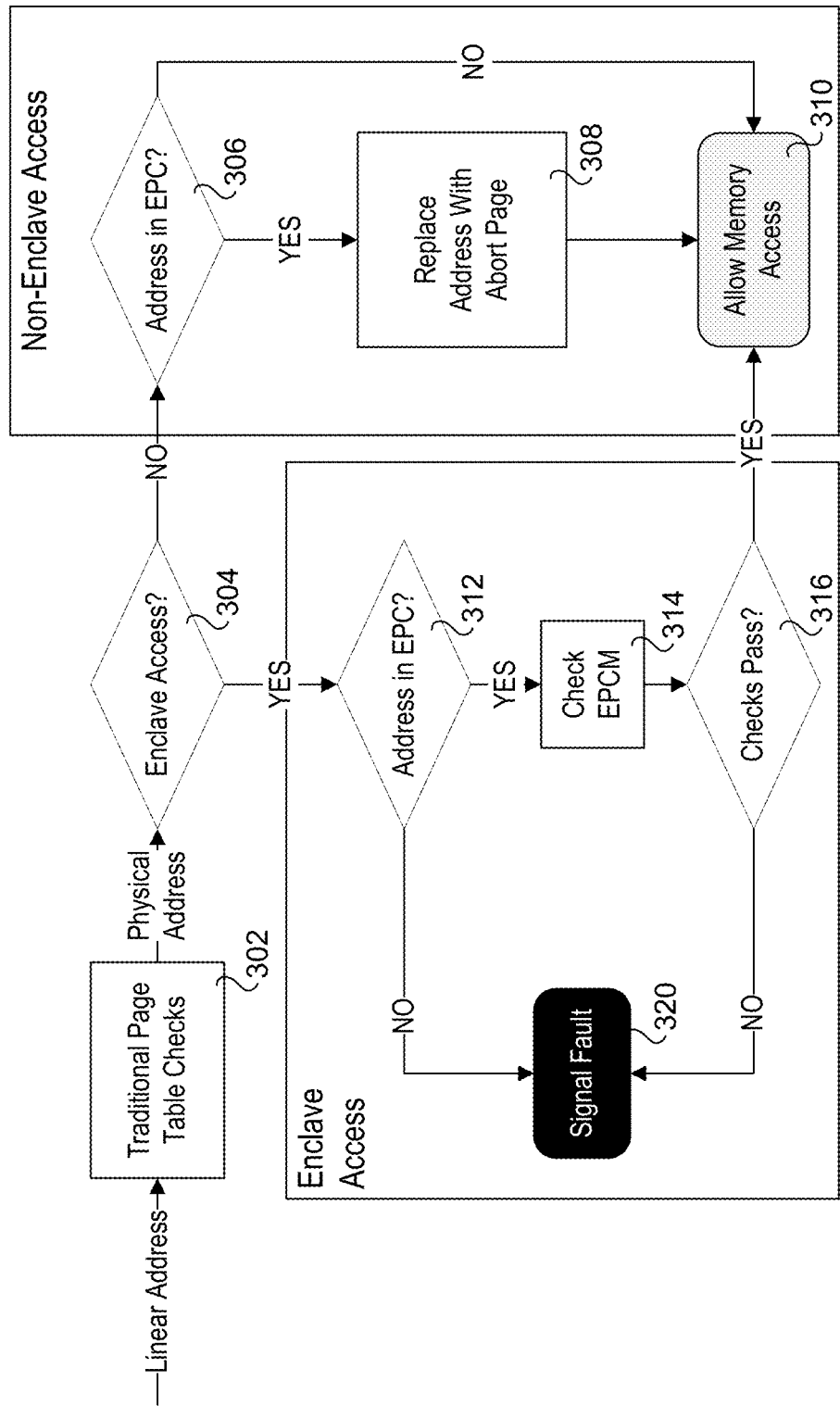
FIG. 3 is a flowchart illustrating operations and logic relating to enclave and non-enclave memory accesses.

FIG. 3 shows a flowchart 300 illustrating operations and logic relating to enclave and non-enclave memory accesses. In a block 302 a linear memory address is received and traditional page table checks are performed, resulting in an output physical address. In a decision block 304 a determination is made to whether the physical address corresponds to an enclave access (e.g., the physical address corresponds to a region in physical memory allocated for an enclave). If the answer is NO, the access is a non-enclave access, and the logic proceeds to a decision block 306 in which a determination is made to whether the address is an Enclave Page Cache. Since it shouldn't be (for a non-enclave access), if the answer is YES the logic proceeds to a block 308 in which the address is replaced with an abort page. If the answer to decision block 306 is NO, this is a conventional memory access, which is allowed in a block 310.

Returning to decision block 304, if the memory access is an enclave access the answer is YES, and the logic proceeds to a decision block 312 in which a determination is made to whether the address is an Enclave Page Cache. If the answer is YES, an EPCM check is performed in a block 314, and if the checks pass, as depicted by a decision block 316, the logic proceeds to block 310, thus allowing the memory access. If the answer to either decision block 312 or 316 is NO, the logic proceeds to a signal fault block 320, which signals a memory access fault.

Figure 4:
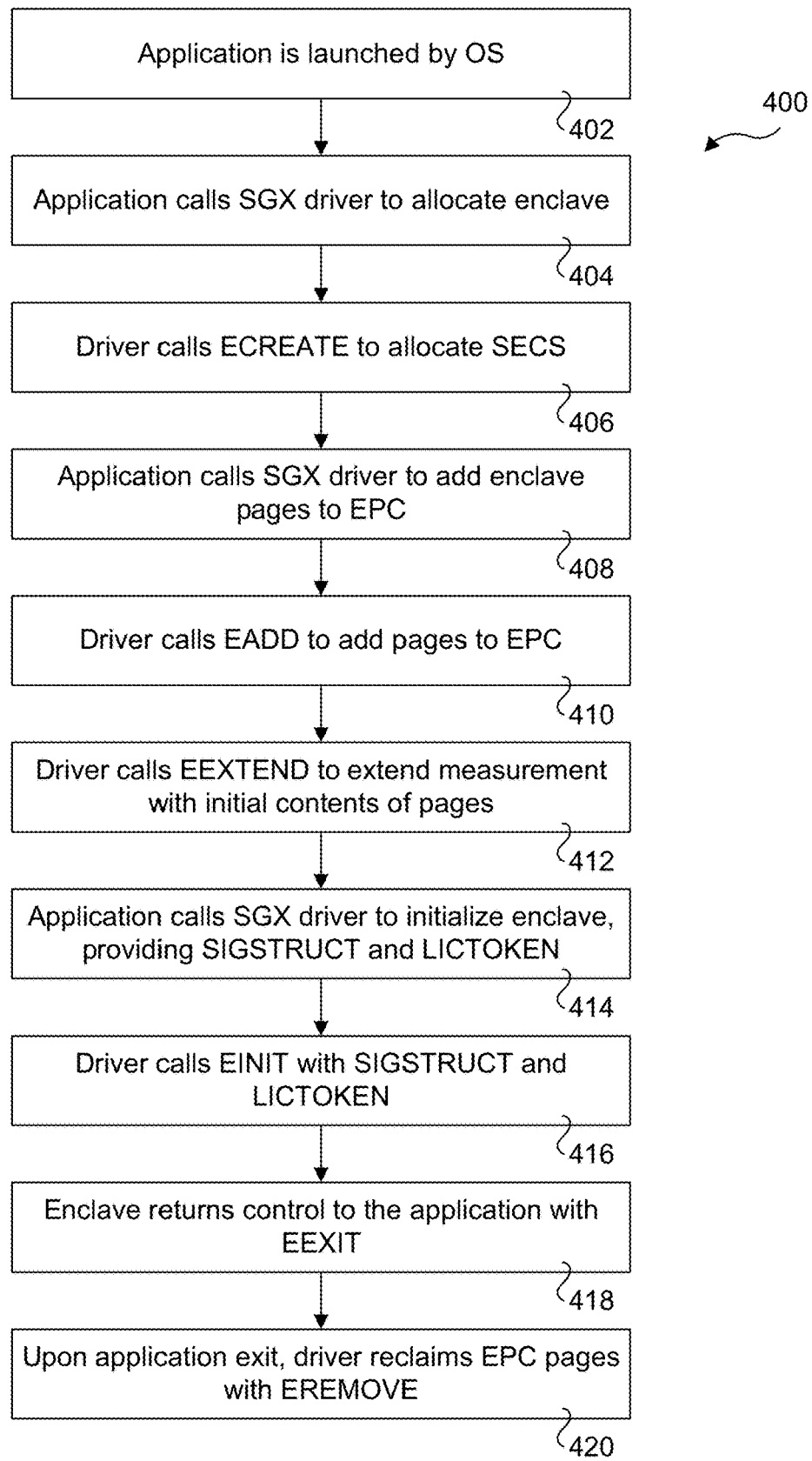
FIG. 4 is a flowchart illustrating operations performed during the lifecycle of a secure enclave.
Figure 5:
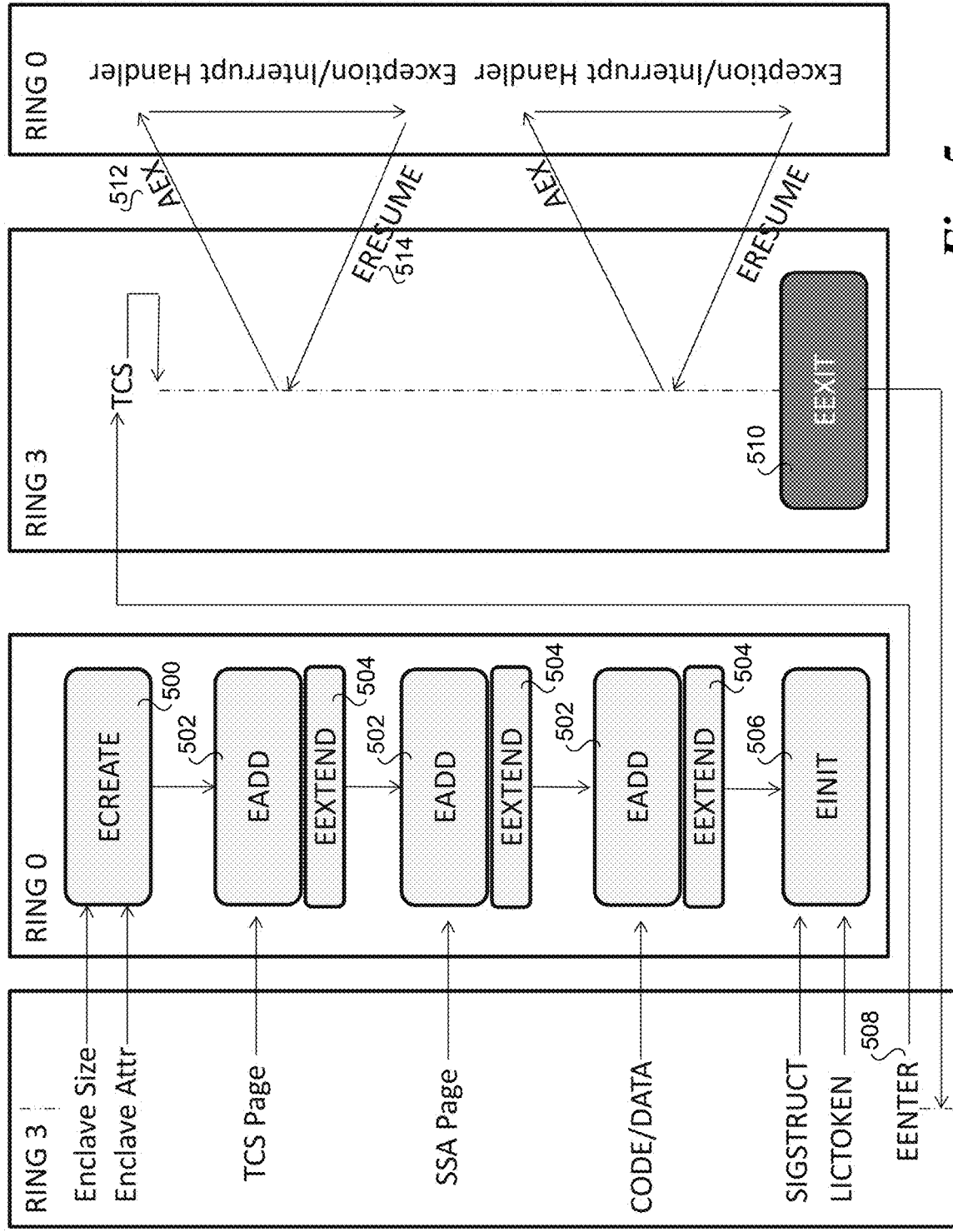
FIG. 5 is a diagram illustrating instructions and code executed in Ring 0 and Ring 3 during the lifecycle of a secure enclave.

Flowchart 400 of FIG. 4 illustrates operations performed during the lifetime of an SGX secure enclave, while corresponding events are schematically depicted in FIG. 5. The process starts in a block 402, wherein the application (to employ the secure enclave) is launched by the operating system (OS). In a block 404, the application calls the SGX driver to allocate an enclave. In response, in a block 406 the SGX driver calls an ECREATE instruction to allocate SECS. The ECREATE instruction creates a unique instance of an enclave, establishes the linear address range, and serves as the enclave's root of trust. This information stored within an SECS generated by ECREATE.

Next, the application calls the SGX driver to add enclave pages to EPC, as shown in a block 408, and the driver calls an EADD instruction to add pages to the EPC, as shown in a block 410. The EADD instruction is used to add Regular (REG) or Thread Control Structure (TCS) pages into the enclave. The system software is responsible for selecting a free EPC page, type, and attributes, content of the page and the enclave to which the page added to. The EADD instruction further generates an initial EPCM entry to indicate type of page (REG, TCS), and a linear address, RWX, associating the page to the enclave SECS.

In a block 412, the SGX driver calls an EEXTEND instruction to extend the measurement with the initial contents of the pages. In one embodiment, the EEXTEND instructions generates a cryptographic hash of the content of the enclave in 256 Byte chunks. EEXTEND is executed 16 times for measuring a 4K page.

The application then calls the SGX driver to initialize enclave, providing a signature data structure (SIGSTRUCT) and a license token (LICTOKEN), as shown in a block 414. In a block 416, the driver calls an EINIT instruction with SIGSTRUCT and LICTOKEN as arguments. The EINIT instruction verifies the enclave's content against the ISV's signed SIGSTRUCT and initializes the enclave, marking it ready to be used. It also Validate SIGSTRUCT is signed using SIGSTRUCT public key, verifies the enclave measurement matches the measurement specified in SIGSTRUCT, verifies the enclave attributes are compatible with SIGSTRUCT, and record the sealing identity (sealing authority, product id, SVN) in the SECS.

The application then enters the enclave with an EENTER instruction, as shown in a block 418. The EENTER instruction checks that the TCS is not busy and flushes TLB entries for enclave addresses, transfers control from outside enclave to pre-determined location inside the enclave, and change the mode of operation to be in enclave mode. [I intentionally left out the other details—we don't need them].

At this point the enclave is ready for use by the application. Subsequently, an application will either exit the enclave on its own (e.g., in response to a user or automated control input to exit the enclave), or in connection with shutting down the application. This is depicted in a block 418, wherein the enclave returns control to the application with an EEXIT instruction. The EEXIT instruction clears the enclave mode and TLB entries for enclave addresses, transfers control from inside enclave to a location outside specified by RBX [what is this? (I presume some register)], and marks the TCS as not busy. The responsibility to clear register state is on enclave writer (the runtime system).

Upon application exit, the driver reclaims EPC pages with an EREMOVE instruction, as depicted in a block 420.

As shown in FIG. 5, in the illustrated embodiment each of an ECREATE instruction 500, an EADD instruction 502, an EEXTEND instruction 504 and an EINIT instruction 506 are executed in RING 0, which corresponds the highest privilege level of the host processor (also referred to as kernel mode). Meanwhile, an EENTER instruction 508 and an EEXIT instruction 510 are executed in RING 3, which is used for user-level software (also referred to as user mode).

Enclave Entry and Exiting

Critical to preserving the integrity of an enclave is to control transfer of execution into and out of an enclave. The entry process needs to clear any cached translations that overlap with the enclave's protected address region. This ensures that all protected enclave memory accesses are properly checked. The entry process must identify where inside the enclave the processor should transfer control and enable enclave mode of execution. Exiting an enclave must again clear any cached translations referring to the enclave's protected address region so that no other software can use the cached translations to access the enclave's protected memory.

While operating in enclave mode, an interrupt, fault or exception may occur. Traditionally, the processor would vector to a fault handler specified by system software. The fault handler saves the register state and services the event. Once the event has been serviced, system software restores the register state and returns control to where software was interrupted. Allowing system software to read and/or modify the register state of an enclave places system software within the trust boundary of the enclave. Consequently, SGX introduces a new routine to protect the integrity and confidentiality of the enclave.

SGX offers the EENTER and EEXIT instructions to enter and exit an enclave programmatically (e.g. as part of call/return sequence). When enclave exit occurs due to an event, the processor invokes a special internal routine called Asynchronous Exit (AEX) which saves the enclave register state, clears the registers, sets the faulting instruction address to a value specified by EENTER. The ERESUME instruction restores the state back to allow the enclave to resume execution.

The EENTER instruction is the method to enter the enclave under program control. To execute EENTER, software must supply an address of a TCS that is part of the enclave to be entered. The TCS indicates the location inside the enclave to transfer control and where inside the enclave AEX should store the register state. When a logical processor enters an enclave, the TCS is considered busy until the logical processors exits the enclave. SGX allows an enclave builder to define multiple TCS structures, thereby providing support for multithreaded enclaves.

EENTER also defines the Asynchronous Exit Pointer (AEP) parameter. AEP is an address external to the enclave which is used to transition back into the enclave after an AEX. The AEP is the address an exception handler will return to using IRET. Typically the location would contain the ERESUME instruction. ERESUME transfers control to the enclave address retrieved from the enclave saved state.

Asynchronous events, such as exceptions and interrupts may occur during execution inside an enclave. These events are referred to as Enclave Exiting Events (EEE). Upon an EEE, the processor state is securely saved inside the enclave and then replaced by a synthetic state to prevent leakage of secrets. The process of securely saving state and establishing the synthetic state is performed by the AEX routine.

As part of the EEE the AEP is pushed onto the stack as the location of the faulting address. This is the location where control will return after executing the IRET (Interrupt Return instruction). The ERESUME can be executed from that point to reenter the enclave.

After AEX has completed, the logical processor is no longer in enclave mode and the exiting event is processed normally. Any new events that occur after the AEX has completed are treated as having occurred outside the enclave.

After system software has serviced the event that caused the logical process to exit an enclave, the logical processor can re-start execution using ERESUME. Unlike EENTER, ERESUME restores registers and returns control to where execution was interrupted. If the cause of the exit was an exception or a fault and was not resolved, then the event will be triggered again. For example, if an enclave performs a divide by 0 operation, executing ERESUME will cause the enclave to attempt to re-execute the faulting instruction. In order to handle an exception that occurred inside the enclave, software should enter the enclave at a different location and invoke an exception handler, the EENTER instruction should be used. The exception handler can attempt to resolve the faulting condition or simply return and indicate to software that the enclave should be terminated.

Returning to FIG. 5, in response to an interrupt, fault or exception the AEX routine is invoked, and the enclave register state is stored in the enclave's active State Save Area (SSA). Each enclave thread has a dedicated SSA frame entry that is pre-defined by the Independent Software Vendor (ISV) for that thread. The instruction pointer is initialized to an area referred to as the trampoline code. This code launches an appropriate interrupt handler used to handle the fault, exception, or interrupt, which is executed in RING 0. After the interrupt handler is completed, an ERESUME instruction 514 is executed, returning execution to the application running in RING 3. Extending Packet Processing to Trusted Programmable and Fixed-function Accelerators Generally, packet processing operations may be implemented via execution of software, including execution of software components that are installed into and executed in secure enclaves. However, execution of software requires processing resources that are generally shared for executing various types of software on a compute platform. For example, today's processors include multiple cores, each with their own local memory caches and a shared memory cache. These processor cores are used to execute software instructions (e.g., machine level instructions from compiled source code) at one or both of an operating system level, and a user application level. In virtualized environments, multiple layers of software are running on the cores of a platform's host processor. This provides great flexibility (since software, by its nature, can be easily changes to perform different functions), but at a performance cost.

One way to address this reduction in performance is to use programmable and/or fixed-function accelerators, such Field Programmable Gate Arrays (FPGA)s, Graphic Processor Units (GPUs), encryption/decryption engines, etc.,. Generally, an accelerator, as used herein, is a hardware-based component or embedded logic block that is used to offload software-based processing from CPU cores, resulting in performance improvements for various types of applications. In accordance with further aspects of embodiments disclosed herein, aspect of SGX enclaves are extended to such programmable and fixed-function accelerators.

Under a programmable accelerator, a programmable component, such as a Field Programmable Gate Array (FPGA) or similar type of programmable logic component can be programmed to perform a set of logical operations that effect one or more functions. Since the components are programmable, they can be reprogrammed to before a different functions. Under a fixed-function accelerator, the hardware-based logic for implementing the function is fixed, meaning it is not reprogrammable. It is further noted that, as used herein, a hardware-based accelerator may still execute instructions (e.g., embedded instructions, firmware, etc.), but such instructions are not executed on one of the processor cores, but rather are executed via processing capabilities provided by the accelerator. For example, GPUs may have dozens of cores that are used to execute software (compiled for the particular GPU instruction set)—these cores are separate from the CPU cores, and thus may be used to offload software-based processing from the CPU cores.

Under conventional usages, accelerators may be implemented on a processor (e.g., a processor employing a System on a Chip (SoC) architecture) that includes one or more accelerators, or accelerators may be included in components that are separate from the processor (e.g., in an accelerator card deployed in an expansion slot of a compute platform, or a component mounted to a circuit board or included in a multi-chip module or package).

Depending on the particular type of accelerator, the accelerator may have on-board (or otherwise local memory) and/or may be configured to direction access memory outside the accelerator, such as accessing system memory on the platform using DMA data transfers. In some cases an accelerator's memory space may be configured as Memory-Mapped Input-Output (MMIO), under which the accelerator address space is mapped into the system memory address space using virtual memory addresses. In one embodiment, secure enclaves may be implemented in the MMIO accelerator address space in a manner similar to that described above for implementing secure enclaves in system memory address space.

In order to extend aspects of SGX enclaves to programmable and fixed-function accelerators, several SGX aspects need to be addressed. For example, how can we extend trust so you can offload policy to an accelerator? How do you carve out memory in an accelerator that no one but a secure enclave can see? The following embodiments addresses these and many other aspects of SGX to support use of SGX enclaves with accelerators. These aspects include extended trust to support offloading policies to accelerators.

Figure 6:
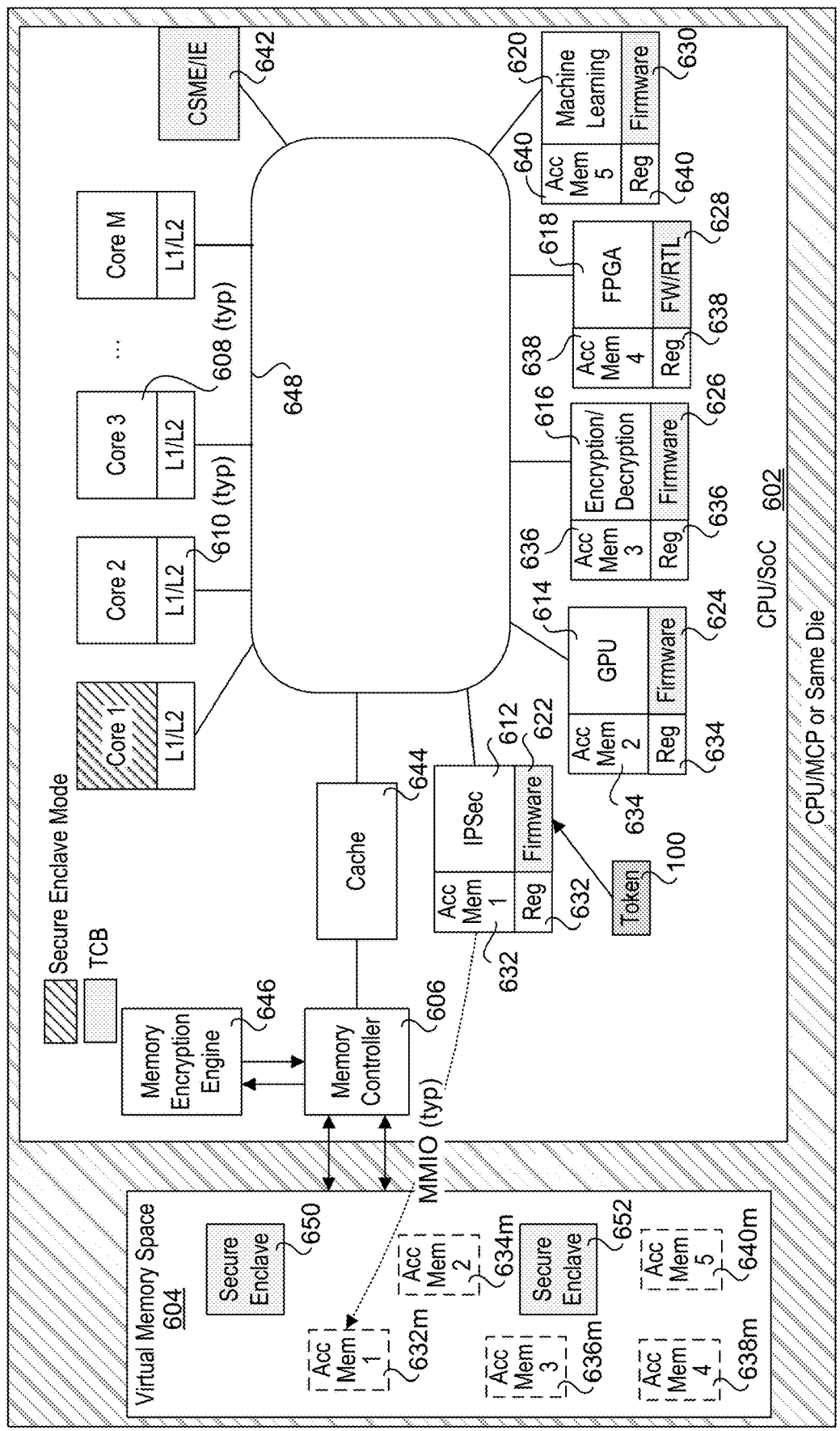
FIG. 6 is a schematic diagram illustrating an architecture including a CPU/SoC having multiple embedded hardware-based accelerators coupled to memory having a virtual address space including multiple secure enclaves.

FIG. 6 shows an architecture 600 including a CPU and/or SoC 602 coupled to memory 604 via a memory controller 606. CPU/SoC 602 includes M cores 608, each including local L1 (Level 1) and L2 (Level 2) caches 610. CPU/SoC 602 further includes multiple accelerators, including an IP Sec (Internet Protocol Security) accelerator 612, a graphics processing unit (GPU) 614, an encryption/decryption accelerator 616, a FPGA 618, and a machine learning accelerator 620. Each of these accelerators includes respective firmware 622, 624, 626, 628, and 630, and respective memory 632, 634, 636, 638, and 640. In addition, an accelerator may have one or more registers, respectively shown as registers 633, 635, 637, 639, and 641.

In the illustrated embodiment, CPU/SoC 602 further includes a converged security and manageability engine/innovation engine (CSME/IE) 642, a cache 644, and a memory encryption engine 646. In some embodiments, original equipment manufacturers (OEMs) may want to deploy customized functionality to augment the facilities provided by the CSME functions provided by CSME/IE 642). These may be implemented by the IE portion of CSME/IE 642, which is also referred to as an OEM innovation engine. Generally, the use of the IE is optional.

Generally, a CPU/SoC will include one or more interconnects for interconnecting various components on the chip or die. In the embodiment illustrated in FIG. 6, a ring interconnect 648 is used. Optionally, other types of interconnect structures may be used, such as a mesh interconnect, torus interconnect, a hierarchical interconnect, etc.

In one embodiment, the memory system employs supports memory coherency across the various caches and system memory, forming a coherent memory domain. Memory coherency is supported by L1/L2 caches 610, cache 644, memory controller 606, and ring interconnect 648, and other components coupled to ring interconnect 648 that are not shown, such as caching agents. In one embodiment, ring interconnect 648 employs a multi-layer messaging protocol supporting memory coherency. In one embodiment the multi-layer protocol comprising the Universal Path Interconnect (UPI) protocol (formerly known as the Quick Path Interconnect® (QPI) and the Keizer Technology Interconnect (KTI). In one embodiment, cache 644 is implemented as a last-level cache (LLC).

Virtual address space 604 is depicted as including two secure enclaves 650 and 652 for illustrative purposes. In an actual implementation, one or more secure enclaves may be configured and implemented in the manner described herein. Virtual address space 604 is further depicted as including MMIO memory regions 632*m*, 634*m*, 636*m*, 638*m*, and 640*m* corresponding to respective accelerator memories 632, 634, 636, 638, and 640. As one of skill in the art will understand, the MMIO memory regions are not copies of the accelerator memories in a system memory device, but rather the virtual address space of the system memory is extended to enable software running in the system memory physical address space to access accelerator memories as if they were part of the system memory. The use of MMIO memory regions 632*m*, 634*m*, 636*m*, 638*m*, and 640*m* is optional, as depicted by the dashed lines for each MMIO memory region.

Figure 7:
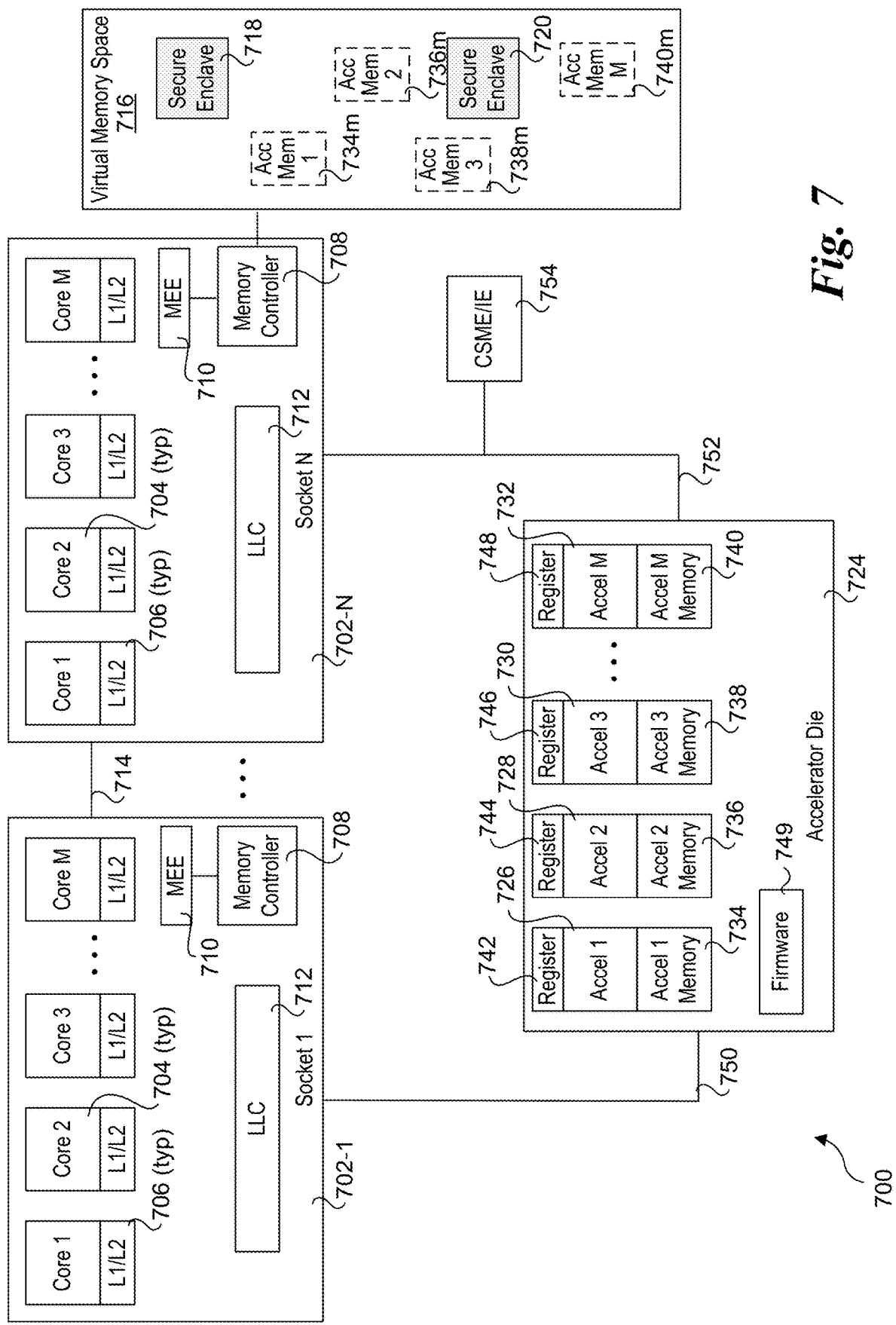
FIG. 7 is a schematic diagram illustrating a multi-socket platform architecture including multiple sockets coupled to an accelerator die including a plurality of hardware-based accelerators.

FIG. 7 shows a multi-socket architecture 700 including N sockets 702-1 . . . 702-N, also labeled Socket 1 . . . Socket N. Under "socket" terminology, as is used in the art, a processor/CPU/SoC is installed in a physical socket on a printed circuit board or the like; rather than refer to the processor/CPU/SoC, these are simply referred to as sockets. As illustrated, each socket sockets 702-1 . . . 702-N has a similar configuration, and includes a CPU/SoC having multiple processor cores 704, each with local L1/L2 caches 706, a memory controller 708, an MEE 710, and an LLC 712. In one embodiment, each of sockets 702-1 . . . 702-N has an architecture similar to CPU/SoC 602, with zero or more accelerator units. For simplicity and to avoid clutter, further details of the internal structure of sockets 702-1 . . . 702-N are not shown.

In one embodiment, multi-socket architecture 700 is configured as a non-uniform memory access (NUMA) architecture. Under a NUMA architecture, each NUMA node includes a socket and has its own local memory, with each local memory having a virtual memory address space that is unique within the system such that any virtual memory address in the system has a unique address. Collectively, the system virtual memory address space is the combination of the local memory address spaces. In additional aspect of a NUMA architecture is a given NUMA node is able to access the local memory of another NUMA node. In the illustrated embodiment of FIG. 7, this is facilitated by socket-to-socket interconnects 714 between pairs of sockets. Generally, when a system includes more than two NUMA node sockets, the NUMA node sockets may be physically arranged in a single row, a triangle (for three NUMA node sockets), or a grid. In some embodiments, a NUMA system may have a respective socket-to-socket interconnects between pairs of sockets, such that each socket is interconnected directly to each other socket. Under another embodiment, multiple NUMA node sockets are arranged in a grid and the socket-to-socket interconnects form an interconnect ring connecting the sockets without any crossbar socket-to-socket connections. Some NUMA architectures are three-dimensional, with NUMA nodes physically arranged in 3D space. Multi-socket architecture 700 is illustrative of all of these configurations.

As further depicted in multi-socket architecture 700, socket 702-N is coupled to a local memory 716 in which one or more secure enclaves are implemented (each being created at run-time in the manner described above), as depicted by secure enclaves 718 and 720. As discussed above, each socket in a NUMA architecture is coupled to local memory (via the memory controller for the socket processor/CPU/SoC). For illustrative purposes and to reduce clutter, only a single local memory 716 is shown in FIG. 7, but it will be understood by those having skill in the art that the memory controller in each of the other sockets would be coupled to its own local memory.

Multi-socket architecture 700 also includes an accelerator die 722 including M accelerators 724, 726, 728, and 730, each with respective on-die memory 734, 736, 738, and 740, and one or more registers 742, 744, 746, and 748. Accelerator die 722 also includes firmware 749, which for simplicity is depicted as a single block but multiple blocks of firmware may be implemented in some embodiments. For example, each accelerator may have its own block of firmware.

In one embodiment, portions of local memory 716's virtual address space are mapped as MMIO memory regions 734m, 736m, 738m, and 740m corresponding to respective accelerator memories 734, 736, 738, and 740. As before, use of MMIO is optional. For illustrative purposes, all of the accelerator memories are MMIO mapped to the same local memory (since the other local memories are not shown); in an actual implementation, different accelerator memories may be MMIO mapped to different local memories.

Multi-socket architecture 700 further includes interconnects 750 and 752 and a CSME/IE 754. Interconnects 750 and 752 are used to interconnect accelerator die 724 to sockets 702-1 and 702-N, respectively. Interconnect 752 is also depicted as interconnecting CSME/IE 754 with each of socket 702-N and accelerator die 724. Generally, interconnects 750 and 752 can be implemented as any type of interconnect technology suitable for high-speed and secure communication. In one embodiment, Interconnects 750 and 752 are Peripheral Component Interconnect Express (PCIe) interconnects.

Figure 8:
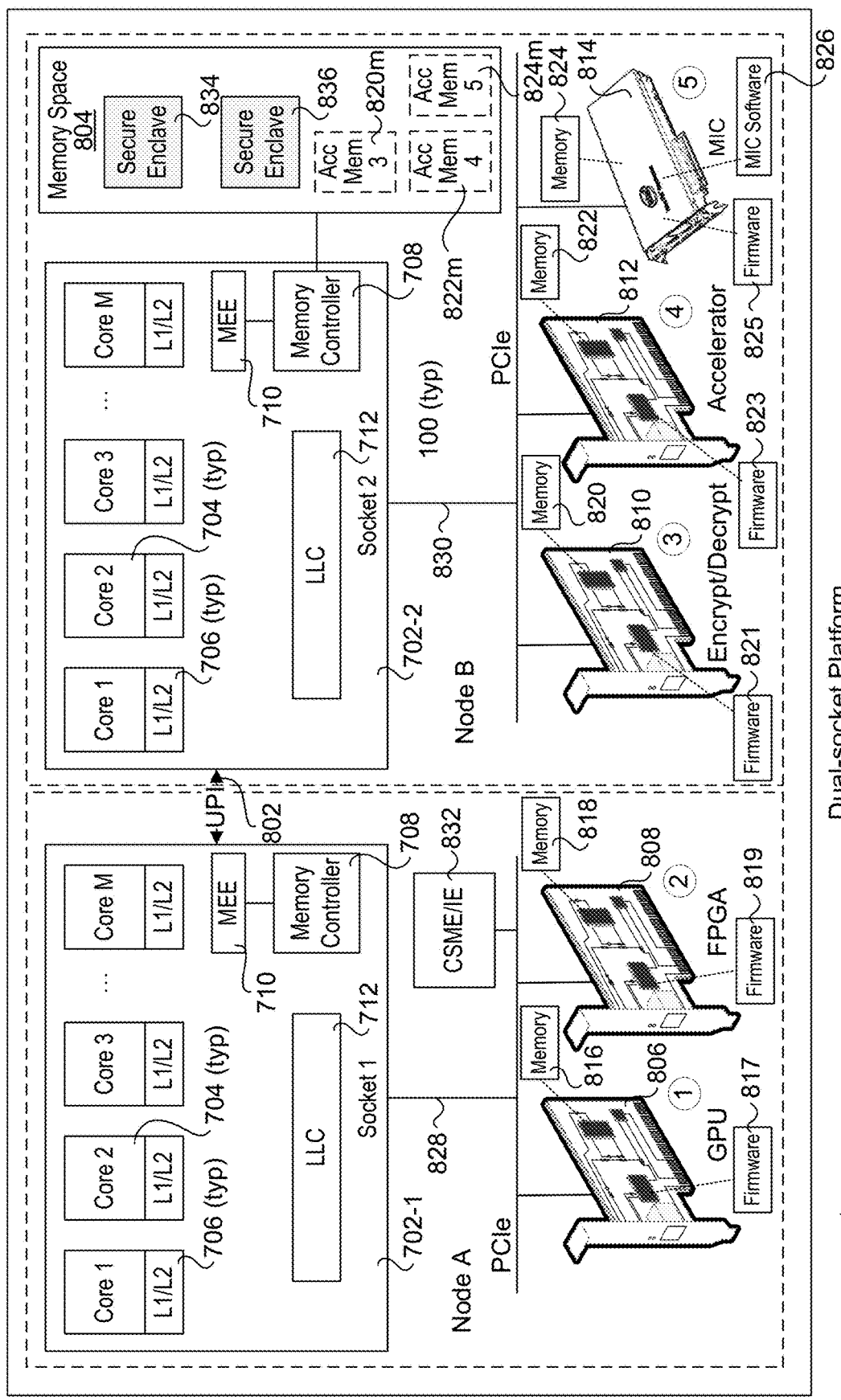
FIG. 8 is a schematic diagram of a dual-socket platform employing a NUMA architecture and including multiple expansion cards including hardware-based accelerators.

FIG. 8 shows a dual-socket platform 800 employing a NUMA architecture including a pair of NUMA nodes A and B. Dual socket platform 800 includes a pair of sockets 702-1 and 702-2 interconnected by a socket-to-socket interconnect 802, which in the illustrated embodiment is a UPI interconnect. Each socket 702-1 and 702-2 has a processor/CPU/SoC having a similar architecture to that illustrated for sockets 701-1 and 702-N in multi-socket architecture 700. A local memory 804 is coupled to memory controller 708 in socket 702-2; a similar local memory would be coupled to the memory controller of socket 702-1 (not shown).

Each of NUMA nodes A and B includes multiple expansion slots in which expansion cards may be installed (enumerated as slots 1-5), as depicted by a GPU card 806 and an FPGA card 808 for node A, and an encryption/decryption card 810, and accelerator card 812, and a many integrated core (MIC) card 814. Each of these expansion cards includes on-board memory, as depicted by memories 816, 818, 820, 822, and 824, and on-board firmware 817, 819, 821, 823, and 825. In one embodiment, MIC card 824 is an INTEL® XEON PHI™ card that includes a large number of cores (e.g., 60) and runs a local operating system and embedded application software, as depicted by MIC software 826.

In one embodiment, the expansion slots comprise PCIe expansion slots, and each of GPU card 806, FPGA card 808, encryption/decryption card 810, accelerator card 812, and MIC card 814 are PCIe cards. Accordingly, each of sockets 702-1 and 702-2 includes a PCI root complex (not shown) that is the root of a respective PCIe interconnect hierarchy 828 and 830. As further illustrated, a CSME/IE 832 is connected to socket 702-1 via PCIe interconnect hierarchy 828.

Under dual-socket platform 800, memory on-board an expansion card may be mapped as MMIO memory in a manner similar to that discussed above, expect in this case the physical memory is on an expansion card rather than on an SoC or on an accelerator die. In one embodiment the memory address space of memory on expansion cards for a given NUMA node is mapped as MMIO memory to the memory space of the local memory for that node.

An example of this is illustrated in FIG. 8, wherein the memories 820, 822, and 824 are respectively MMIO mapped memory regions 820m, 822m and 824m in local memory 804. As before, the use of MMIO memory is optional. Local memory 804 is further depicted as including secure enclaves 834 and 836, which are created by software running on Node B in the manner for creating secure enclaves described above.

At the heart of a secure execution environment is trusted hardware firmware and software components. In the context computer systems, this is known as a trusted computing base (TCB), which begins with the platform firmware used to initialize a system. Generally, modern computing systems implement firmware in a manner that is highly secure. For example, a system may employ encrypted firmware that uses cryptographic keys that are provided via a trusted platform module (TPM) or similar component.

Under embodiments herein the TCB is extended to the accelerator firmware, which becomes part of a platform's TCB. In each of the embodiments shown in FIGS. 6, 7, and 8, the CSME/IE is a trusted component that is an arbiter of key distribution and operates as the Root of Trust for the platform and operator. A secure enclave can establish a secure channel with the CSME. In one embodiment, the CSME distributes secure tokens to the accelerators and the memory controller/MEE. A secure token is then sent by the accelerator to the memory controller/MEE for each memory access request to memory contained in a secure enclave. In one embodiment, there is one secure token for each secure enclave per accelerator. If a memory access request for a given secure enclave is received from an accelerator with an appropriate token, the memory access request is allowed to proceed. If an improper token (or otherwise no token) is used, the memory access request is blocked. In one embodiment, each token is associated with a valid virtual memory address range (or valid ranges).

In another embodiment, a secure token is provisioned to software running in a secure enclave and an accelerator, wherein the secure token is used to encrypt and decrypt data accessed by software in the secure enclave and the accelerator that is stored in a portion of memory that is external to all secure enclaves. The data is stored in an encrypted form such that even if the data was accessed (e.g., by a software hack or physical attack) by a malicious party the accessed data would be useless without the secure token. In this embodiment, the secure token is provisioned to each of the software in the secure enclave and the accelerator using communication over secure channels.

Another aspect of a trusted computing environment is trust between the CSME and the accelerators. When the accelerators are implemented on an CPU/SoC that also includes a CSME, such as under CPU/SoC 602 of architecture 600, the trust is implied via the manufacturing process by the SoC vendor. For example, the various firmware that is on an SoC may be sealed, and is generally not reprogrammable once the firmware is programmed at the manufacturing facility. Thus, the only entity that has access to the accelerator firmware is the SoC vendor. Conversely, since system firmware is generally stored in a component (e.g., integrated circuit such as flash memory) that is separate from a CPU/SoC, the trustworthiness of the system firmware is controlled by the system manufacturer rather than the CPU/SoC vendor. There are various well-known mechanism for maintaining the trustworthiness of the system firmware, such as using a TPM as discussed above.

Figure 9:
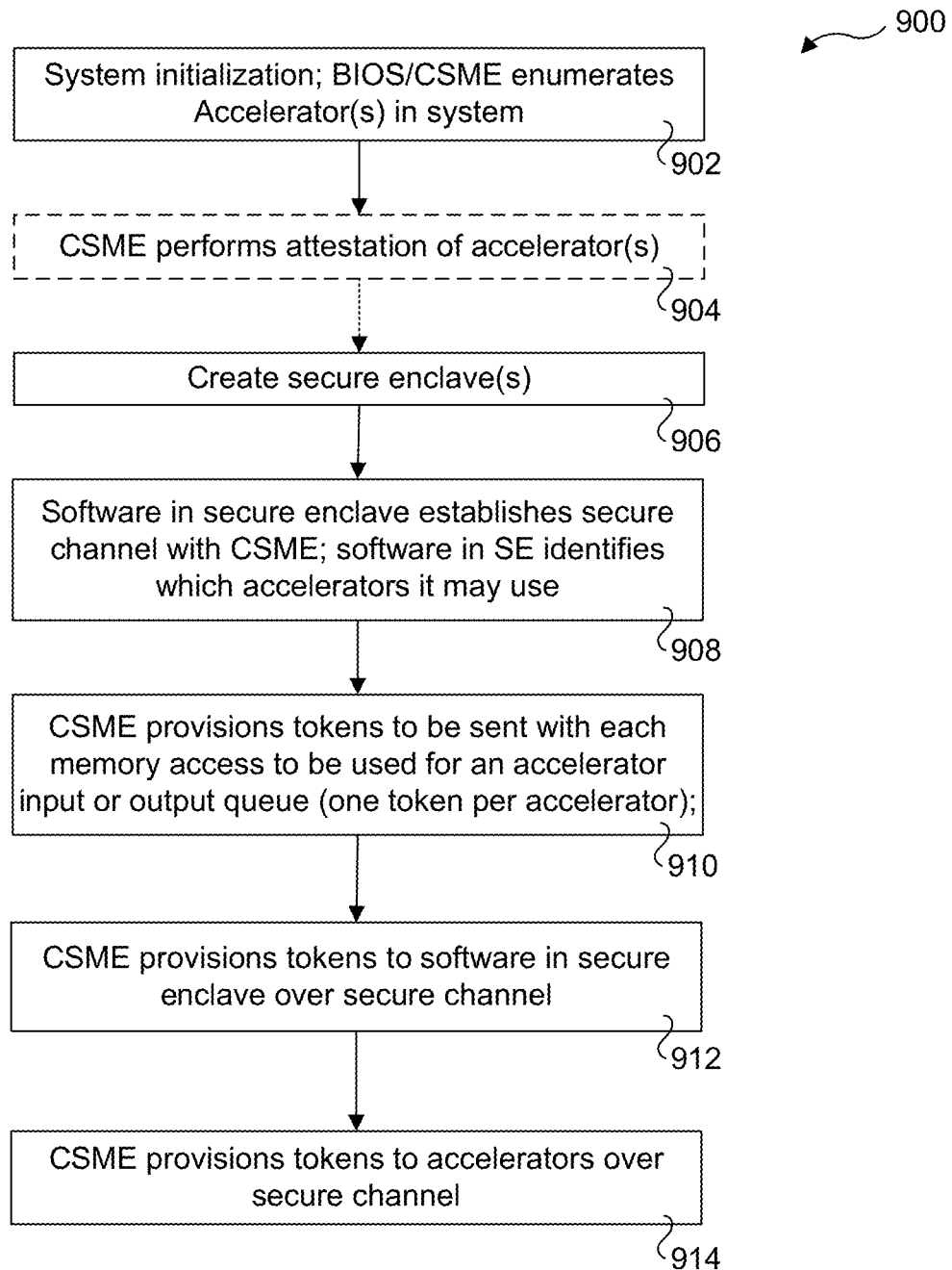
FIG. 9 is a flowchart illustrating operations for provisioning tokens to be used to access encrypted portions of memory external to a secure enclave, according to one embodiment.

FIG. 9 shows a flowchart 900 illustrating operations for provisioning tokens to be used to access encrypted portions of memory external to a secure enclave, according to one embodiment. The process begins in a block 902, with the CSME enumerating the accelerator(s) in the system in connection with performing system initialization. Various well-known mechanisms may be used to enumerate the accelerator(s), with the mechanism that is implemented depending on the particular type of accelerator. For example, for the embodiment of FIG. 6 that includes accelerators that are on CPU/SoC 602, logic in CSME/IE 642 (or elsewhere on the CPU/SoC) can be hard-coded to identify and enumerate that accelerators. Under the embodiment of FIG. 7 that includes an accelerator die, CSME/IE 754 can communicate with the accelerator die 724 to retrieve information identifying the available accelerators. Under the embodiment of FIG. 8 under which the accelerators are on expansion cards, if the cards are PCIe cards the cards will be enumerated during system initialization using conventional PCIe enumeration operations, and this information can be made available to CSME/IE 832. The CSME/IE can then query each card individually to determine what type and number of accelerators it has.

Under some embodiments, an attestation of one or more accelerators may be optionally performed, as shown in a block 904. For example, since accelerators on expansion cards are neither integrated on the CPU/SoC or on an accelerator die or chip that is mounted to a platform main board (or otherwise physically part of the platform), their trustworthiness is unknown to the system integrator. Accordingly, an attestation process may be performed to authenticate a given accelerator. Various means are available for performing attestation that are known in the art. In one embodiment, a SIGMA (Sign and Message Authentication Code) attestation scheme is used. In other embodiments, other attestation schemes may be used, such as UUIDs/GUIDs (Universally or Globally unique identifiers) that are in a registry list of valid accelerators or other schemes. Generally, the validity of the UUID/GUID may be made using a local list of valid UUID/GUIDs, a hashing function such that when hashed a valid UUID/GUID will return a known result, or attestation may be performed by sending the UUID/GUID (or other indicia) over a network to an attestation service or the like.

As depicted by the dashed connector between blocks 904 and 906, the operations in blocks 906, 908, 910, 912, and 914 are performed after system initialization. In a block 906, one or more secure enclave are created in the manner discussed above. Next, in a block 908, software in each secure enclave establishes a secure channel with the CSME, and then identifies which accelerators it may use. Various mechanisms for enabling firmware and/or software running on a platform to establish a secure channel with a CSME on the platform may be used, such as establishing an encrypted communication channel with the CSME. In one embodiment, application-level software running in a secure enclave is provided access to the CSME, while application-level software running outside of a secure enclave is not. In some embodiments, an operating system CSME driver may be used by software running in a secure enclave to communicate with a platform's CSME.

In a block 910, the CSME generates tokens to be sent with each memory access to a portion(s) of memory used for accelerator input and output queues, or other purposes. One token is generated per accelerator per secure enclave. The CSME then provisions to tokens to the software running in the secure enclave over the secure channel and to the memory controller/MEE in a block 912. The process is completed in a block 914, wherein the CSME provisions tokens to the accelerators over a secure channel (for each accelerator, and for each secure enclave).

Figure 9A:
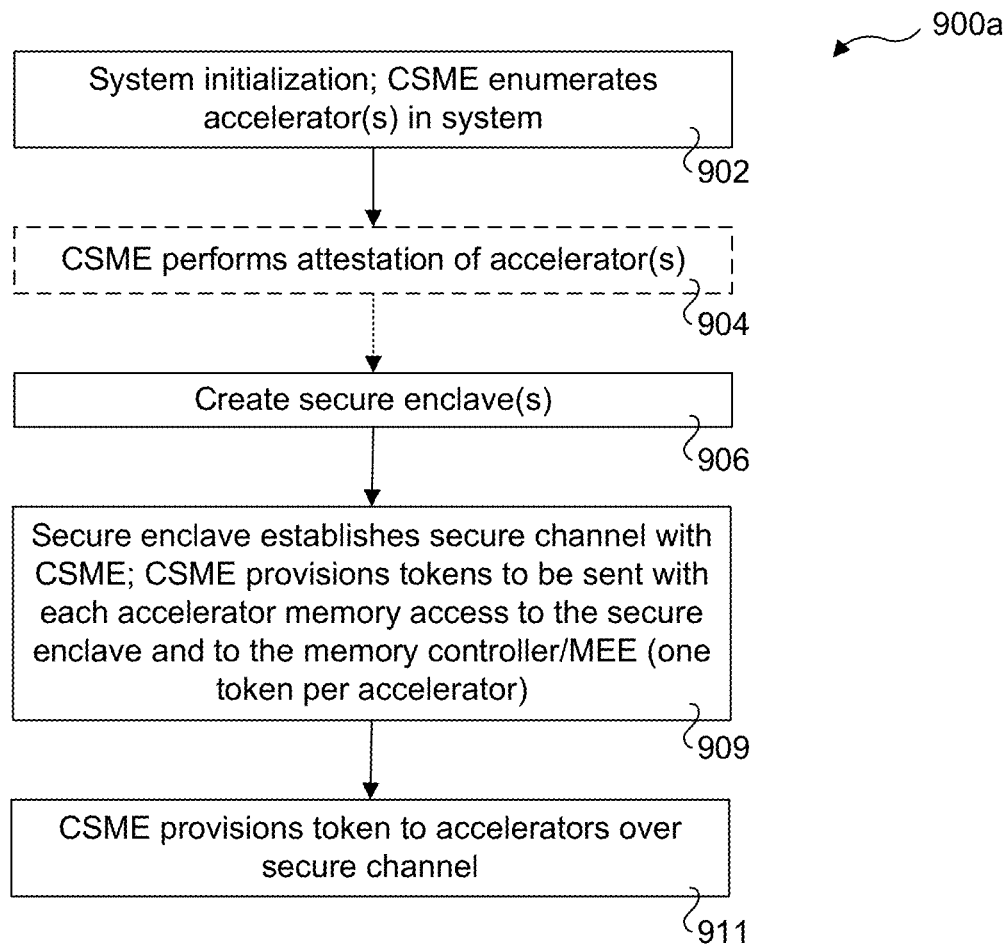
FIG. 9a is a flowchart illustrating operations for provisioning tokens to be used to by accelerators to access memory within secure enclaves, according to one embodiment.

Under one embodiment, accelerators are enabled to access memory in secure enclaves. FIG. 9a shows a flowchart 900a illustrating operations for provisioning tokens to support this functionality. The operations of blocks 902, 904, and 906 are the same as in flowchart 900. Next, in a block 909, each secure enclave establishes a secure channel with the CSME, and the CSME provisions tokens to be sent with each accelerator memory access to memory within a secure enclave to the memory controller/MEE. One token is provided per accelerator per secure enclave. The process is completed in a block 911, wherein the CSME provisions tokens to the accelerators over a secure channel (for each accelerator, and for each secure enclave).

Figure 10:
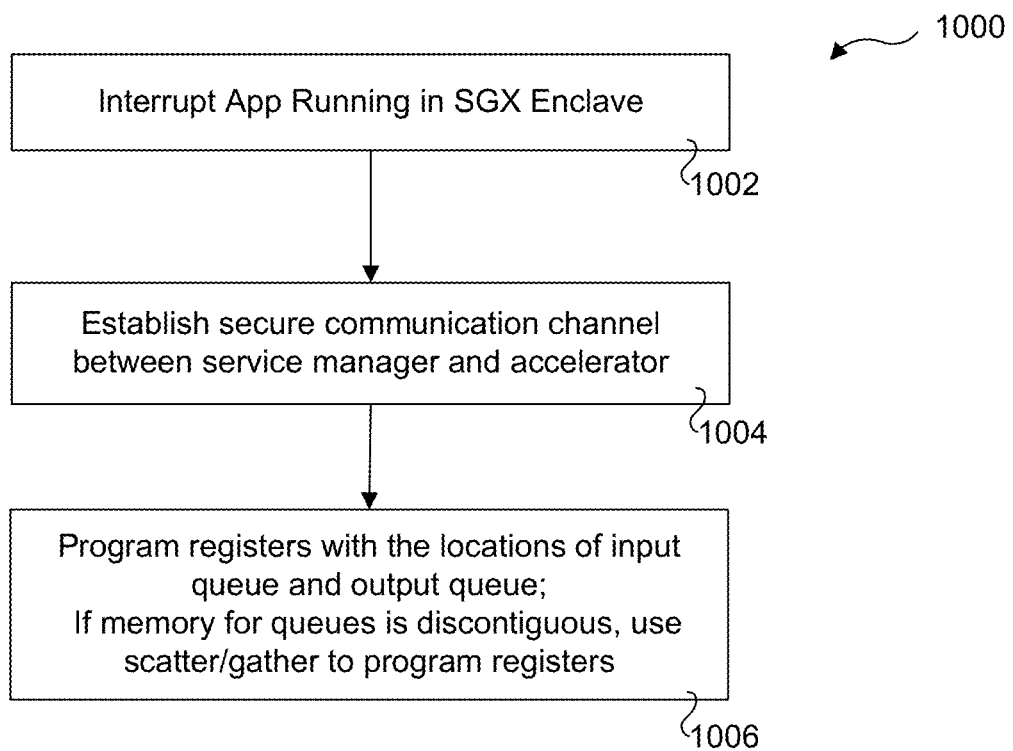
FIG. 10 is a flowchart illustrating operations for configuring a secure an accelerator to perform an operation or service in a service chain.

FIG. 10 shows a flowchart 1000 illustrating operations for configuring a secure an accelerator to perform an operation or service in a service chain. In a block 1002, software running in a secure enclave is interrupted. In a block 1004, a secure communication channel is established between a service manager or management entity and the accelerator. In a block 1006, the service manager programs registers in the accelerator with pointers to the starting addresses (i.e., locations of) an input queue and an output queue. If the memory for the input and/or output queue is discontinuous, a "scatter/gather" mechanism for programming registers in the accelerator may be used.

Figure 11A:
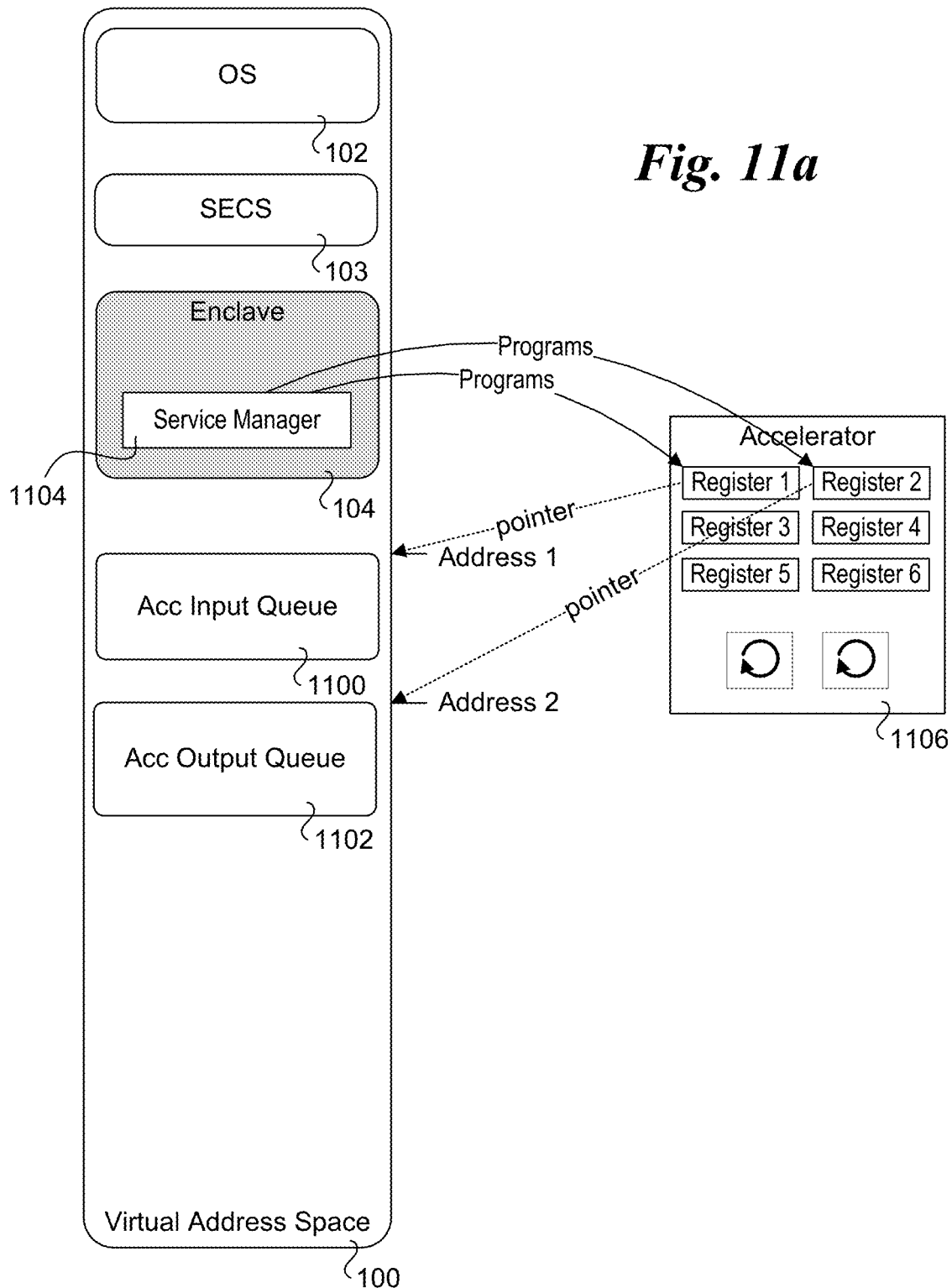
FIG. 11a is a diagram illustrating programming a pair of registers in an accelerator to point to the locations of an input queue and output queue to be used by the accelerator.
Figure 11B:
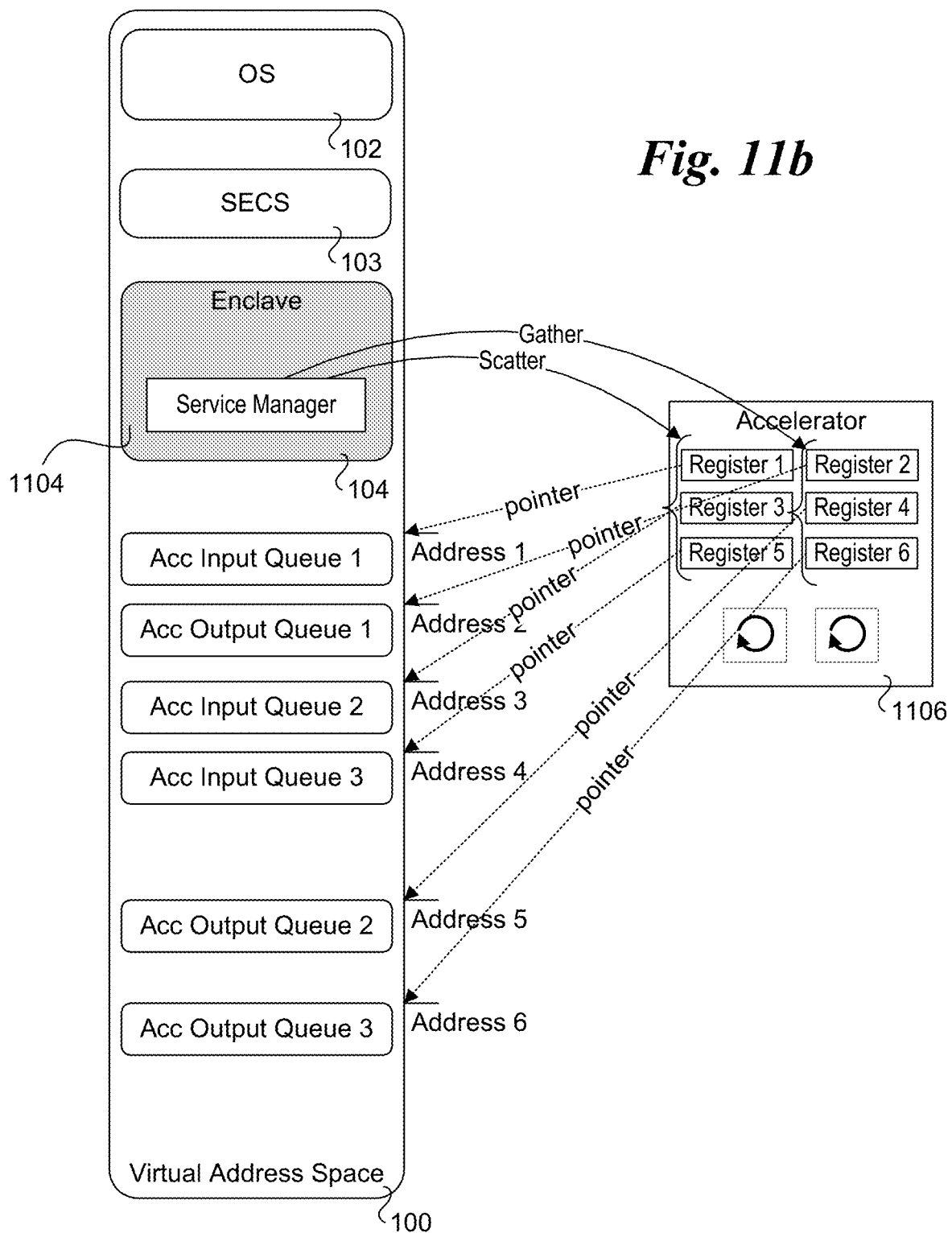
FIG. 11b is a diagram illustrating programming a multiple registers in an accelerator to point to the locations of multiple discontiguous input queues and output queues to be used by the accelerator.

The effect of programming the registers is illustrated in FIGS. 11a and 11b. As shown in FIG. 11a, virtual address space 100 includes an Acc(eleromter) input queue 1100 and an Acc output queue 1102, with respective Addresses 1 and 2. A service manager 1104 running in enclave 104 programs a first register (1) with a pointer to Address 1 and a second register (2) with a pointer to Address 2.

FIG. 11b shows an example of the scatter/gather approach. In this example, there are three discontiguous Acc input queues (1, 2, and 3) and three discontiguous output queues (1, 2, and 3). Under the "scatter" portion of the approach, the starting addresses 1, 3, and 4 of the Acc input queues 1, 2, and 3 are written to respective registers 1, 3, and 5 on accelerator 1106. Under the "gather" portion of the approach, the starting addresses 2, 5, and 6 of Acc output queues 1, 2, and 3 are written to respective registers 2, 4, and 6 of accelerator 1106.

Figure 12:
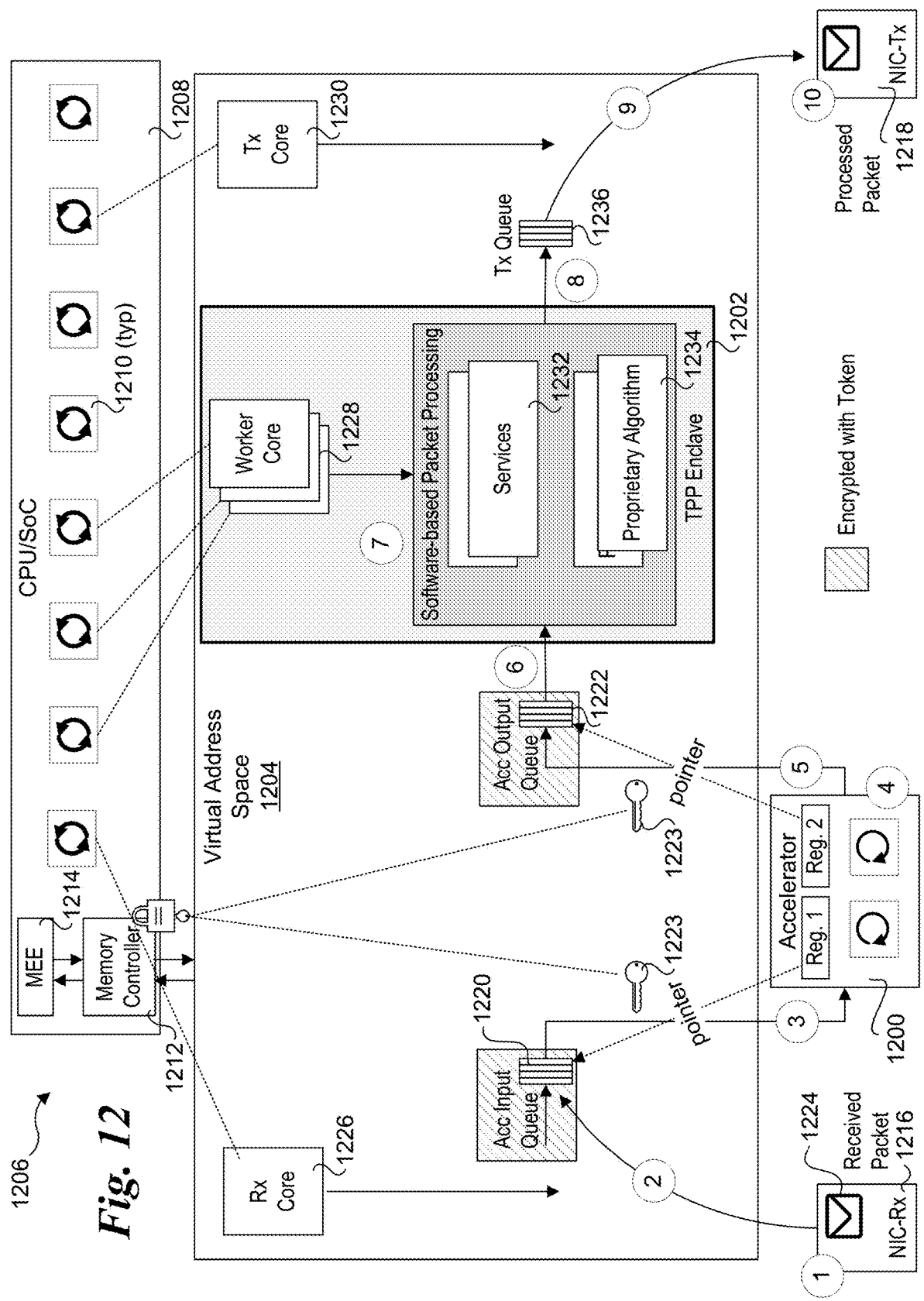
FIG. 12 is a schematic diagram illustrating a first example of a packet processing service chain including hardware-based packet-processing performed by an accelerator and software-based packet processing performed by software executing in a Trusted Packet Processing (TPP) enclave under which accelerator input and output queues are implemented in encrypted memory external to a secure enclave.

FIG. 12 illustrates an example of a packet processing service chain including hardware-based packet-processing performed by an accelerator 1200 and software-based packet processing performed by software executing in a Trusted Packet Processing (TPP) enclave 1202 located in system virtual address space 1204 of a platform 1206. Platform 1206 further includes a CPU 1208 including multiple processor cores 1210, a memory controller 1212, and an MEE 1214, as well as a NIC including a NIC receive port 1216 and a NIC transmit port 1218. The architecture of platform 1206 is generalized, such that accelerator 1200 may be either on the CPU/SoC (FIG. 6), in an accelerator die (FIG. 7), or in an expansion card (FIG. 8).

Prior to performing the service chain on one or more packet flows received at NIC receive port 1216, a first register (1) of accelerator 1200 has been programmed with a pointer to the starting address of an Acc input queue 1220, and a second register (2) of accelerator 1200 has been programmed with a pointer to the starting address of an Acc output queue 1222. In the illustrated embodiment, both of Acc input queue 1220 and Acc output queue 1222 reside in a portion of system virtual address space 1204 that is outside of TPP Enclave 1202. In the illustrated embodiment, the data in each of Acc input queue 1220 and Acc output queue 1222 is encrypted through use of a token 1223 (depicted as a key), as explained below in further detail.

In the illustrated embodiment, the packet-processing service chain proceeds as follows, wherein respective operations are depicted by encircled numbers 1, 2 . . . 10. In a first operation (1), a packet 1224 is received at NIC Rx port 1216 and placed in a buffer or queue in the Rx port (not shown). In operation 2, packet data corresponding to packet 1224 is copied from NIC Rx port 1216 into Acc input queue 1220. In one embodiment, this operation is facilitated by software executing in memory 1204, as depicted by an Rx Core 1226. The use of Rx core 1226, worker cores 1228, and Tx core 1230 in FIG. 12 is to illustrate where the software that is executed by one of cores 1210 resides in memory, and an associated function performed by the execution of the software on that core.

Prior to placing the packet data in Acc input queue 1220, one or more operations (not shown to avoid clutter) may be performed on the packet data. For example, packet header data may be inspected to classify the packet, and packets belonging to a certain flow, set of flows, or a certain traffic class(es) may be placed into Acc input queue 1220. As illustrated in further service chain examples below, the ordering in a given service chain of software-based packet processing operations and hardware-based packet processing operations performed by an accelerator may vary, and the operations depicted for the service chains in the figures herein are merely exemplary and non-limiting.

In one embodiment, Acc input queue is used as a work input queue for accelerator 1200. Acc input queue may be implemented in various ways using various data structures. In one embodiment, Acc input queue is implemented as a circular FIFO (First-in, First-out) queue that includes head and tail pointers or the like. The data contained in a given FIFO "slot" may be the actual packet data to be processed, or may be a pointer to the address of the packet data that is stored elsewhere in virtual address space 1204 (such as a memory buffer). The use of head and tail pointers enables software executed by Rx Core 1228 to insert new entries in the circular FIFO while enabling accelerator 1200 to pull entries that have been inserted in the input queue in an asynchronous manner.

As discussed above, in the illustrated embodiment, the data in Acc input queue 1220 and Acc output queue 1222 is encrypted. In one embodiment, encryption and decryption operations performed in conjunction with associated memory writes and reads to memory addresses within the portions of virtual address space 1204 allocated to Acc input queue 1220 and Acc output queue 122 are implemented using the token that has been previously provisioned by the CSME to the accelerator. Under this approach, the token is used to encrypt data to be written to the ACC input and output queues and decrypt encrypted data provided by the memory controller in response to read requests to the ACC input and output queues. At the same time, from the memory controller and MEE point of view, these memory accesses appear as normal accesses to a system's virtual address space.

Figure 13:
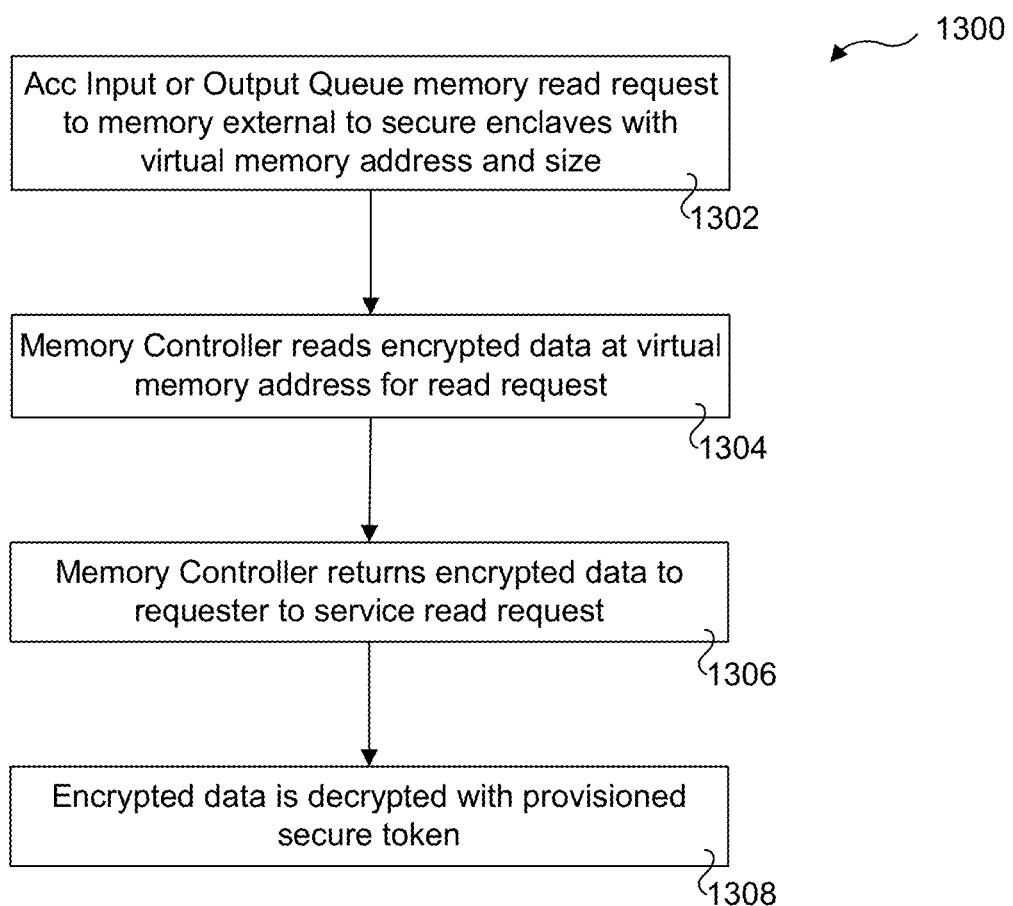
FIG. 13 is a flowchart illustrating operations performed during a memory read access to encrypted memory that is external to a secure enclave, according to one embodiment.

FIG. 13 shows a flowchart 1300 illustrating operations and logic performed to implement a memory read of memory in an Acc input queue or output queue that is located in a portion of memory that is external to a secure enclave, according to one embodiment. In a block 1302, an Acc input queue or output queue memory read request is submitted to the memory controller with a virtual memory address corresponding to the address at which the beginning of the data is located, along with data specifying the size of the data to be read (e.g., number of blocks or cachelines).

Figure 14:
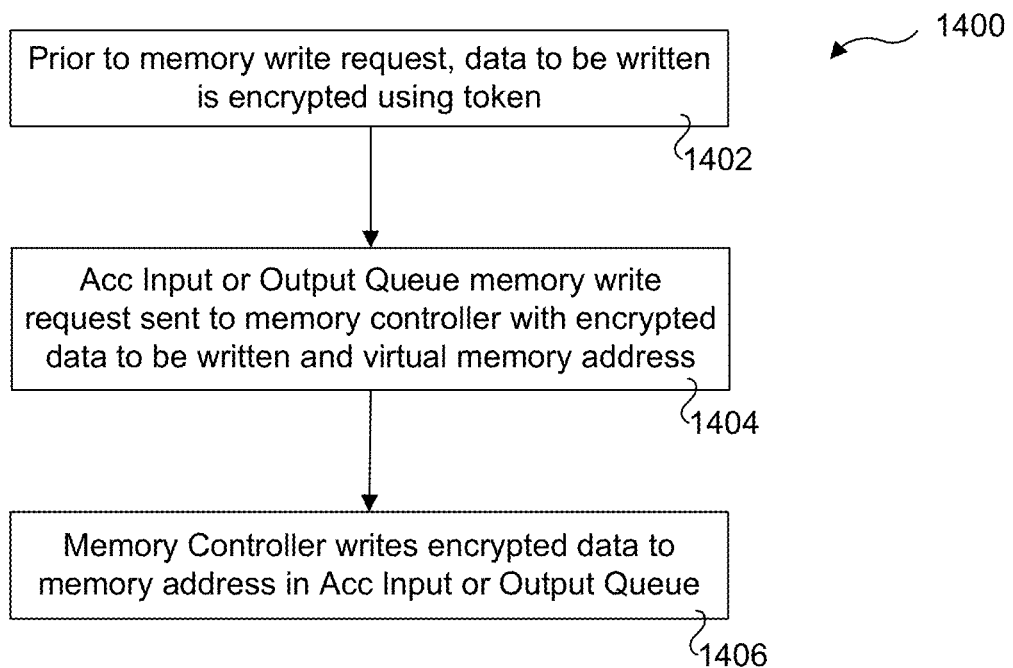
FIG. 14 is a flowchart illustrating operations performed during a memory write access to encrypted memory that is external to a secure enclave, according to one embodiment.

In a block 1304, the memory controller reads an amount of data defined by the size beginning at the specified virtual memory address. From the memory controller's point of view, this is a normal memory read request, and the memory controller is unaware that the data is encrypted. As described below with reference to FIG. 14, when the data in the Acc input and output queues are written by the memory controller, the data provided with the memory write request is encrypted with a token provision to each of software running in the secure enclave and an accelerator that will access the Acc input and output queues.

In a block 1306, the memory controller returns the encrypted data to the requestor of the memory read request (either software running in the secure enclave or firmware running on the accelerator). In a block 1308, the requester then decrypts the data with the token it was previously provisioned with. It is possible that the same accelerator may be used to offload software-based packet processing tasks via separate instances of software running in separate secure enclaves. In one embodiment, there is an association maintained on each accelerator concerning which Acc input and output queues are used for which (software running in) secure enclave.

In operation 3, accelerator 1200 pulls packet data to be processed from Acc input queue 1220 using one or more memory read requests. As described above, the actual packet data to be pulled may either be stored in a FIFO slot in the input queue, or be pointed to by a corresponding pointer entry in the slot. Following decryption, data that is pulled from Acc input queue 1220 is processed by accelerator 1200 using one or more hardware-based packet processing operations. The types of operations may vary, depending on the particular type of accelerator used and the service operations or functions the accelerator is configured to perform. For example, in one embodiment accelerator 1200 performs one or more IP Sec operations. In other embodiments, the accelerator is an encryption/decryption unit and performs decryption of packets that are received with encrypted data. Other hardware-based packet processing operations may be performed by other types of accelerators. For example, each of a GPU and FPGA may be programmed to perform a wide-variety of packet-processing tasks.

Upon completion of its work, accelerator 1200 places it output (e.g., processed packet data) into Acc output queue 1222, as depicted by operation 5, using a memory write request. In one embodiment, memory writes to Acc input and output queues that are external to secure enclaves are performed using the operations illustrated in flowchart 1400 in FIG. 14. As depicted in a block 1402, prior to issuing the memory write request the data to be written is encrypted using the token that was provisioned to each of (software in) the secure enclave and the accelerator that share access to the Acc input and output queues. For operation 5, the memory write request will be issued from an accelerator using the token associated with the Acc output queue in which the data is to be written. As explained below, software running in a secure enclave may also issue memory write requests to Acc input queues in a similar manner.

In a block 1404, the memory write requestor sends the memory write to the memory controller including the encrypted data to be written along with the virtual memory address at which the beginning of the encrypted data is to be written. The process is completed in a block 1406, in which the memory controller writes the encrypted data to the specified virtual memory address.

Returning to FIG. 12, in operation 6, software executing within TPP enclave 1202 pulls packet data from Acc output queue 1222 using one or more memory read requests to perform software-based packet processing on the packet data. As before, Acc output queue 1222 is an asynchronous queue, such as a circular FIFO queue, that enables entries to be inserted into and removed concurrently in an asynchronous manner.

As discussed above, memory within a secure enclave cannot be accessed by software running external to the secure enclave. This is facilitated through a hardware mechanism built into the processor (CPU/SoC) that is configured using specific processor instructions, as discussed above. As a second level of security, the data in a secure enclave is encrypted by MEE 1214 when it is read into a secure enclave from memory external to the secure enclave. As a companion operation, when data in a secure enclave is written to memory external to the secure enclave, MEE 1214 decrypts the data prior to memory controller 1212 writing it to the memory external to the secure enclave. Pulling packet data from Acc output queue 1222 is implemented via a memory read from memory external to a secure enclave to memory within a secure enclave; thus, operation 6 also includes a data encryption operation performed by MEE 1214.

During operation 7, software-based packet processing is performed on the packet data pulled from Acc output queue 1222, as depicted by services 1232 and proprietary algorithms 1234. Generally, various type of packet processing operations may be performed using software-based packet processing operations, as are known in the art. The software that performs the packet processing services during operation 7 are executed in TPP enclave 1202, a secure enclave, using one or more worker cores 1228 (one or more of the CPU cores 1210). The software-based packet processing operation may constitute a single service in a service chain, or multiple services in a service chain, depending on the services that are to be performed for packets belonging to a given flow or traffic class, in combination with which of these services is offloaded to an accelerator.

Upon completion of the one or more service performed by the software-based packet processing, in an operation 8 the processed packet data is written by software executing in TPP enclave 1202 to a transmit (Tx) queue 1236, which in virtual address space 1204 but external to TPP enclave 1202. As this involves a write of data from software running in a secure enclave into non-secure system memory, the data to be written to memory is encrypted by the software using an applicable token before issuing a corresponding memory write request to the memory controller.

Packets in Tx queues are ready to be dispatched to a Tx port to be forwarded to a next hop along a path toward a destination node or to the destination node if there is only one hop left. In the illustrated embodiment of FIG. 12, during operation 9 software executing in virtual address space 1204 depicted by Tx core 1230 is used to copy packet data in Tx queue 1236 into an appropriate NIC Tx port, depicted here as NIC Tx port 1218. The processed packet is this sent outbound from NIC Tx port 218 onto the network as depicted by operation 10.

Figure 12A:
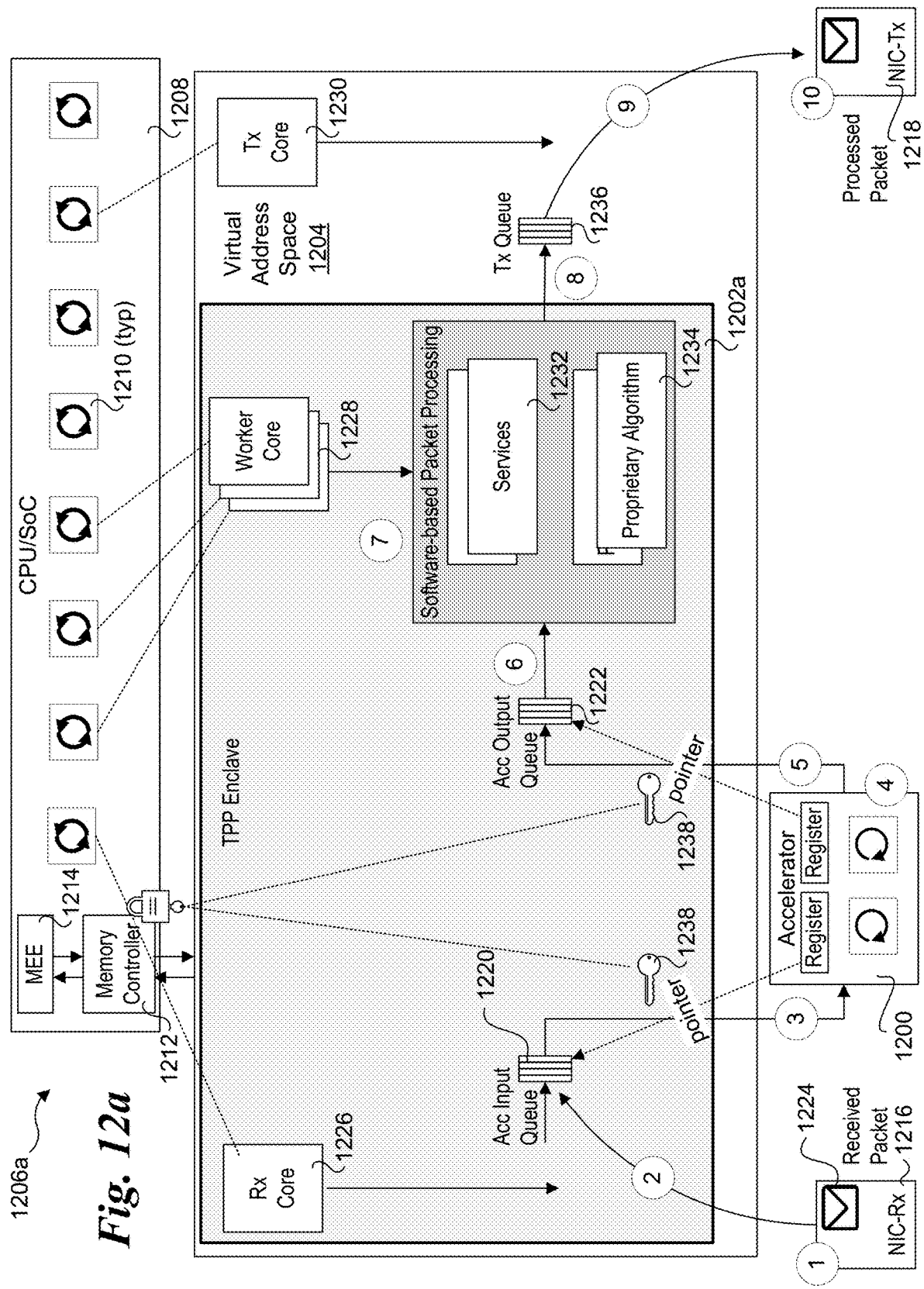
FIG. 12a is a schematic diagram illustrating a second example of a packet processing service chain that is an augmentation of the scheme in FIG. 12 under which the accelerator input and output queues are implemented within secure enclave.

In addition to accessing memory that is external to a secure enclave, an accelerator may access memory that is within a secure enclave using a token provisioned by the CSME. An example of this is schematically illustrated for a platform 1206 in FIG. 12*a*. The service chains in FIGS. 12 and 12*a* are substantially the same, with the difference in FIG. 12*a* being that each of Acc input queue 1220 and acc output queue are in TPP enclave 1202*a* rather than in memory external to a secure enclave, as in FIG. 12. Also, the software executed by Rx core 1226 is also executed within TPP enclave 1202*a*. For illustrative purpose, TPP enclave 1202*a* is depicted as a single block (i.e., a contiguous block of memory address space). However, in an actual implementation, the memory space for a secure enclave may be either a single contiguous block of memory address space, or multiple discontiguous blocks of memory address spaces.

The packet processing operations proceed as follows. As before, a packet 1224 is received a NIC Rx port 1216 a copied into Acc input queue 1220 by operation 2. This is performed by software executing within TPP enclave 1202*a* running on Rx core 1226. As before, the software executing on Rx core may perform other operations that are not illustrated. In this case, since data is being written to a secure enclave the software running on Rx core 1226 uses a memory read operation to read memory in from a buffer or queue (not shown) on NIC Rx port 1216.

During operation 3, accelerator 1200 reads packet data from Acc input queue 1220 (or otherwise reads packet data that is pointed to by an entry in Acc input queue 1220). Normally, this would be prevented, since the accelerator is an entity that is external to TPP enclave 1202*a*. However, accelerator 1200 includes a token 1238 that was previously provisioned to it by the CSME for accessing memory within TPP enclave 1202*a*. Memory controller 1212 also was previously provided with the token, which effectively unlocks access to the secure enclave associated with token 1238, which in this example is TPP enclave 1202*a*. Thus, by including token 1238 with the memory read, accelerator 1200 is enabled to access memory within TPP enclave 1202*a*.

Figure 13A:
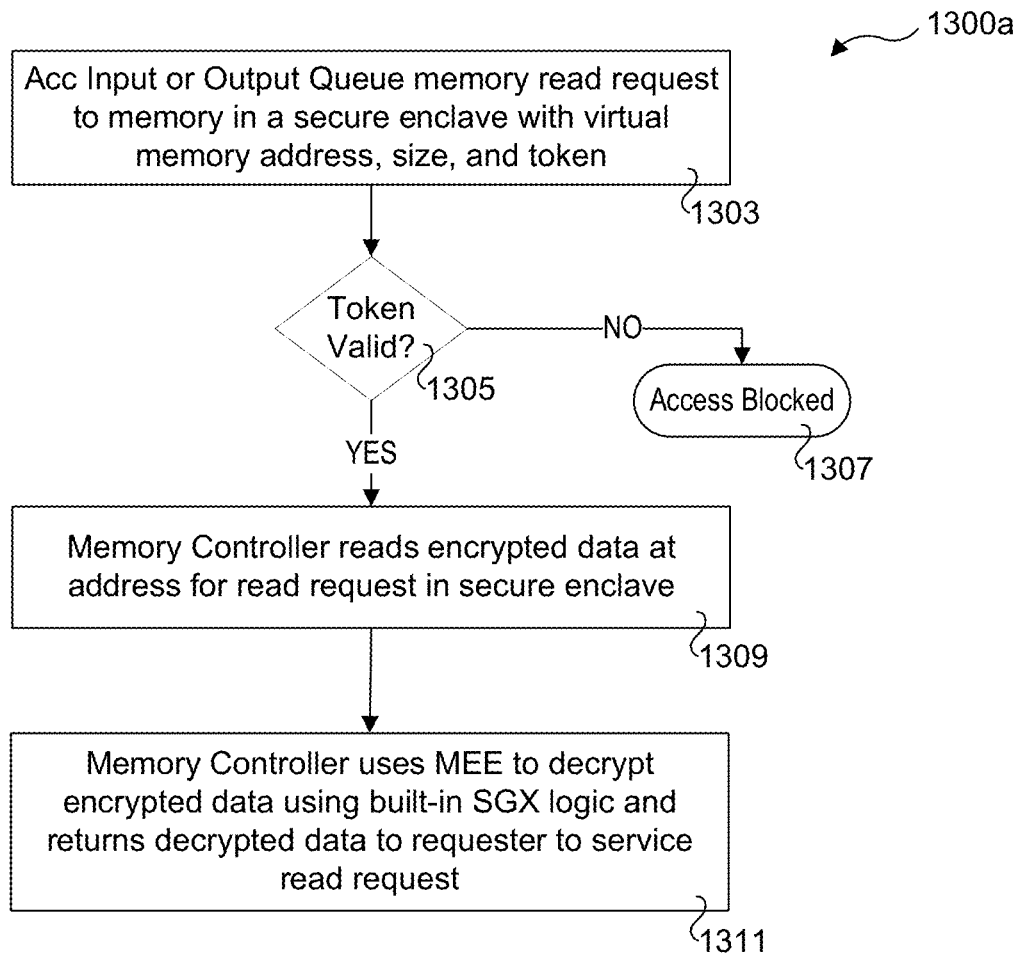
FIG. 13a is a flowchart illustrating operations performed during a memory read access to memory that is within a secure enclave, according to one embodiment.

Further details of this process are illustrated in flowchart 1300*a* of FIG. 13*a*. Under flowchart 1300*a*, the token is only being used for validating the memory read requests and not for encryption and decryption. As discussed above, memory within a secure enclave is encrypted and decrypted using the MEE, and thus data to be read from a secure enclave will be encrypted and needs to be decrypted before being returned to the requester.

The process starts in a block 1303, wherein a read request to memory within a secure enclave is sent to the memory controller include the virtual memory address, the size, and a token. In the context of operation 3, the memory read access request is made by accelerator 1200 using a DMA transfer. Software running in a secure enclave can also request access to memory within the secure enclave.

In a decision block 1305, the memory controller determines whether the token is valid for the virtual memory address included in the memory read request. As discussed above with reference to FIG. 9, the CSME provisions a token for a given secure enclave/accelerator combination to each of the secure enclave, the accelerator, and the memory controller. In one embodiment, the memory controller compares the token sent with the memory read request to its list of tokens to determine whether the token is valid for the read request. If the token is not valid, the memory read request is blocked, as depicted in an exit block 1307, and an error is returned to the requester.

If the token is determined to be valid for the memory read request, the logic proceeds to a block 1309 in which the memory controller reads the encrypted data at the virtual address identified by the memory read request. In a block 1311, the memory controller then passes the encrypted data to the MEE to decrypt the data using built-in SGX decryption logic and returns the decrypted data to the requester (e.g., accelerator 1200) to service the memory read request. In one embodiment, the decrypted data is returned to an accelerator using a DMA transfer.

As before, after reading the packet data from Acc input queue 1220 accelerator 1200 performs one or more packet processing services. Upon completion it writes the processed packet data to Acc output queue 1222. Since this queue is also in a secure enclave, accelerator 1200 includes token 1238 in the write access request, which is sent to memory controller 1212. Memory controller recognizes the token as valid, and performs the memory write request by writing the packet data provided with the request to Acc output queue 1212 using the MEE to encrypt the data.

Figure 14A:
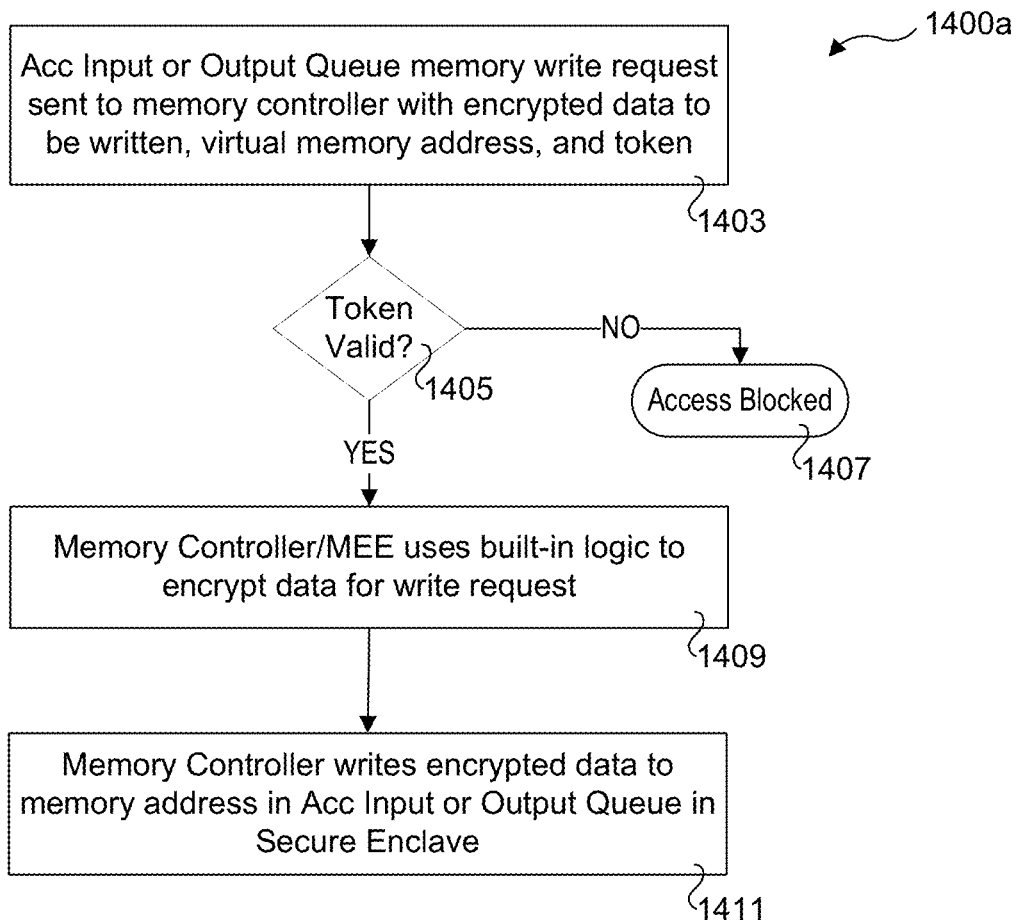
FIG. 14a is a flowchart illustrating operations performed during a memory write access to memory that is within a secure enclave, according to one embodiment.

In further detail, FIG. 14a shows a flowchart 1400a illustrating operations performed during one embodiment of a write memory request issued by an accelerator to write data into a secure enclave. In a block 1403, a memory write request to a virtual memory address range in an Acc input or output queue in a secure enclave is received by the memory controller. The memory write request includes the data to be written, the beginning virtual memory address at which the data is to be written, and a token. In a manner similar to that discussed above for decision block 1305 of flowchart 1300a, a determination is made in a decision block 1405 to whether the token is valid for the memory write request. As before, if the token is determined to be invalid, the memory write request is blocked, as depicted in an exit block 1407.

If the token is determined to be valid, the logic proceeds to a block 1409 is which the memory controller uses the MEE to encrypt the data to be written using the token. The memory controller then writes the encrypted data to the memory address in the Acc input or output queue in a block 1411 to complete the memory write operation.

As with flowchart 1300a, when a write request is issued by an accelerator to access memory within a secure enclave, the token is used to validate the request, but is not used for encryption or decryption. Rather, SGX logic built into the memory controller/MEE is used to encrypt the data provided with the write request, and then the memory controller writes the encrypted data to memory address in the Acc input or output queue (as applicable), as depicted by blocks 1409 and 1411.

The remaining operations 6-10 are the same as before, with the exception that in operation 6 there is no need to include a token since the data is read by software running in TPP enclave 1202a from a memory location that is also within TPP enclave 1202a.

Figure 12B:
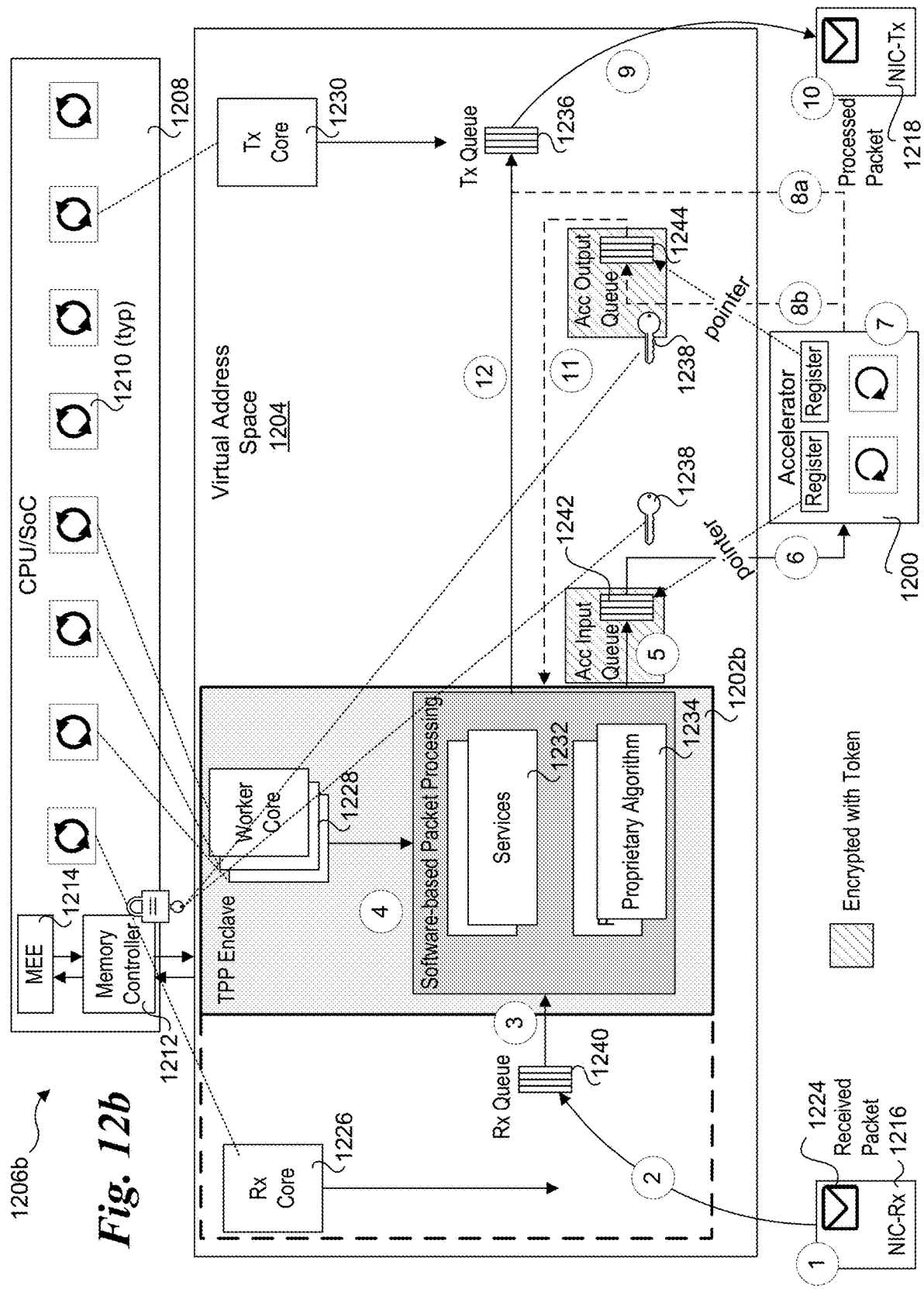
FIG. 12b is a schematic diagram illustrating a third example of packet processing under which an accelerator performs one or more services in parallel with software-based packet processing and/or following software-based packet processing and under which accelerator input and output queues are implemented in encrypted memory external to a secure enclave.

As illustrated in FIG. 12b, accelerators may also be used in combination with secure enclaves under which accelerators perform services in parallel with software-based packet processing and/or following software-based packet processing. In this example, a receive (Rx) queue 1240 resides in a portion of virtual address space 1204 in a platform 1206b that is external to the address space for TPP enclave 1202b. As depicted by the dashed line extension of TPP enclave 1202b, Rx queue 1240 may also be located within the TPP enclave. In operation 2 Packets 124 received a NIC Rx port 1216 are copied into Rx queue 1240 via execution of software running on Rx core 1226. In operation 3, software running in TPP enclave 1202b reads packet data from Rx queue 1240 (or otherwise reads packet data in virtual address space 1204 that is pointed to by a corresponding entry in Rx queue 1240). One or more software-based packet processing services are then performed during operation 4. The service chain may include services that are offloaded to one or more accelerators, as depicted by accelerator 1200. Generally, a service chain or set of parallel services for a given packet flow or service class follows one of the following (non-limiting) patterns under which software-based packet processing is abbreviated as 'SWPP,' '→' indicates services that are sequentially performed, and '||' indicates services that are performed in parallel:

1. Rx Queue→SWPP→Accelerator→Tx Queue→NIC Tx port;
2. Rx Queue→SWPP→Accelerator→SWPP→Tx Queue→NIC Tx port;
3. Rx Queue→SWPP→Tx Queue→NIC Tx port||Accelerator;
4. Rx Queue→SWPP→Tx Queue→NIC Tx port||Accelerator 1 . . . Accelerator N;
5. Acc Input Queue→Accelerator→SWPP→Tx Queue→NIC Tx port;
6. Acc Input Queue→||Accelerator 1 . . . Accelerator N→SWPP→Tx Queue→NIC Tx port;
7. Variations of the foregoing patterns.

In FIG. 12b, in one embodiment pattern #1 is implemented. Following the software-based packet processing services of operation 4, packet data is written to an Acc input queue 1242, which is asynchronously accessed by accelerator 1200 using a memory read with token, as depicted by operation 6. One or more packet processing services is performed by accelerator 1200 during operation 7, and the processed packet data is written to Tx queue 1236 during operation 8a. The processed packet data is then copied to NIC Tx port 1218 and sent out onto the network, as depicted by operations 9 and 10.

In another embodiment, pattern #2 is implemented. Upon completion of packet processing by accelerator 1200, the processed packet data is written to Acc output queue 1244, as depicted by operation 8b. Software executing in TPP enclave 1202b then asynchronously reads the accelerator-processed packet data from Acc output queue 1244 (operation 11), followed by one or more additional software-based packet processing services. Upon completion of the second set of one or more software-based packet processing services, the processed packet data is written to Tx queue 1236, as depicted by operation 12.

Under some embodiments, one or more accelerator services may be performed in parallel, either before, during, or following the software-based packet processing services. In addition, some packet processing services that are performed in parallel will not output processed packet data, but rather will output data derived from the accelerator service or services. For example, a firewall service implemented via an accelerator may be used to mark packets as safe or unsafe, or optionally, may only forward packets that are determined to be safe for further packet processing operations. Accelerator operations that perform machine learning will generally output data relating to information obtained via processing packet data, as opposed to outputting processed packet data to be used for either subsequent packet processing or corresponding to the last service in a service chain.

Figure 12C:
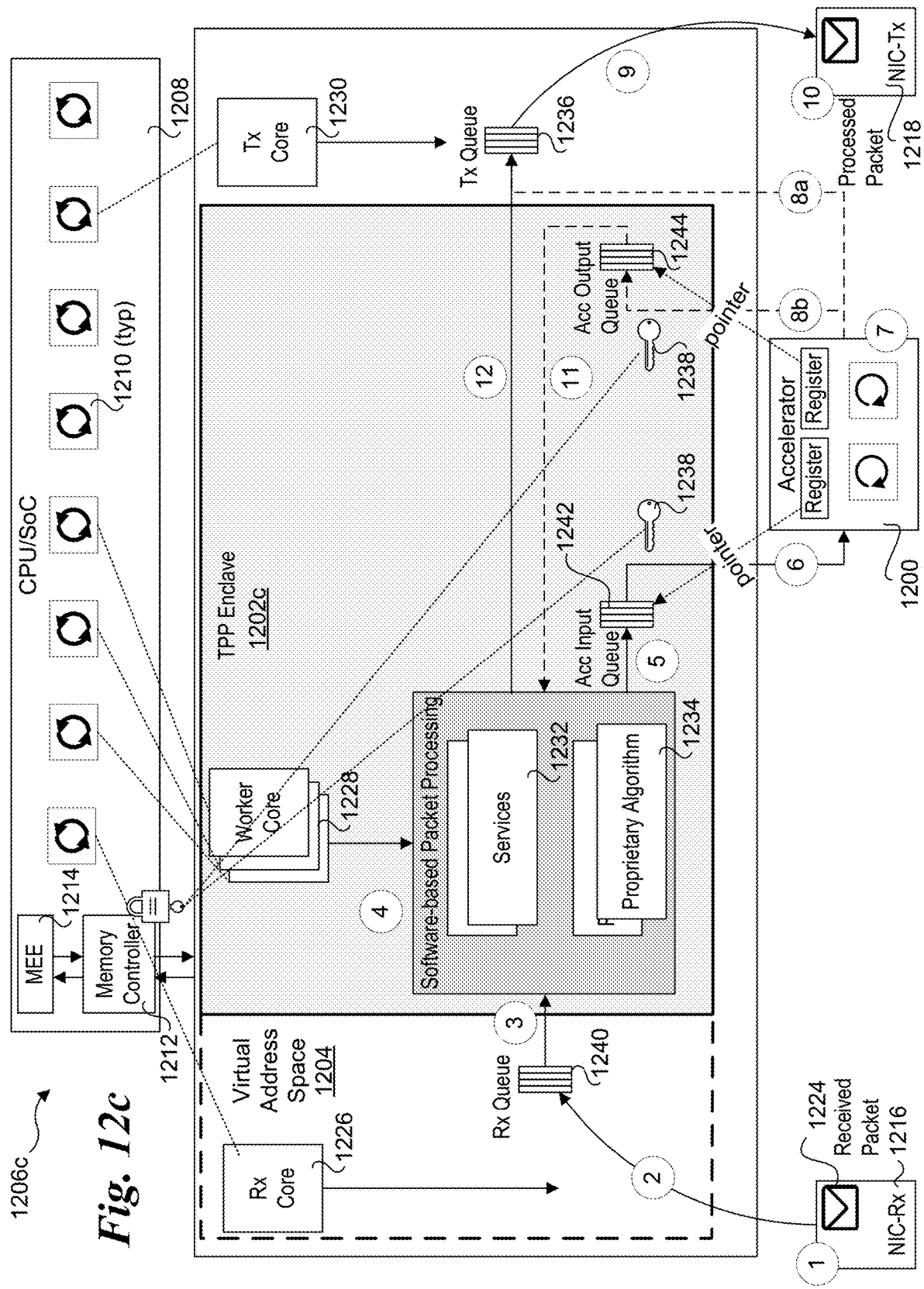
FIG. 12c is a schematic diagram illustrating a forth example of packet processing under which an accelerator performs one or more services in parallel with software-based packet processing and/or following software-based packet processing and under which accelerator input and output queues are implemented a secure enclave.

FIG. 12*c* shows a platform 1206 having a configuration similar to platform 1206*b*, except now Acc input queue 1242 and Acc output queue 1244 are in a TPP enclave 1202*c* rather than external to the TPP enclave. In a manner similar to platform 1206*a* of FIG. 12*a*, memory reads and memory writes employ token 1238 to validate the memory access requests, while encryption and decryption operations are implemented by MEE 1214 using build-in encryption and decryption logic without using token 1238. In one embodiment, read and write memory access requests are performed using the operations and logic of flowcharts 1300*a* and 1400*a*, respectively.

Figure 12D:
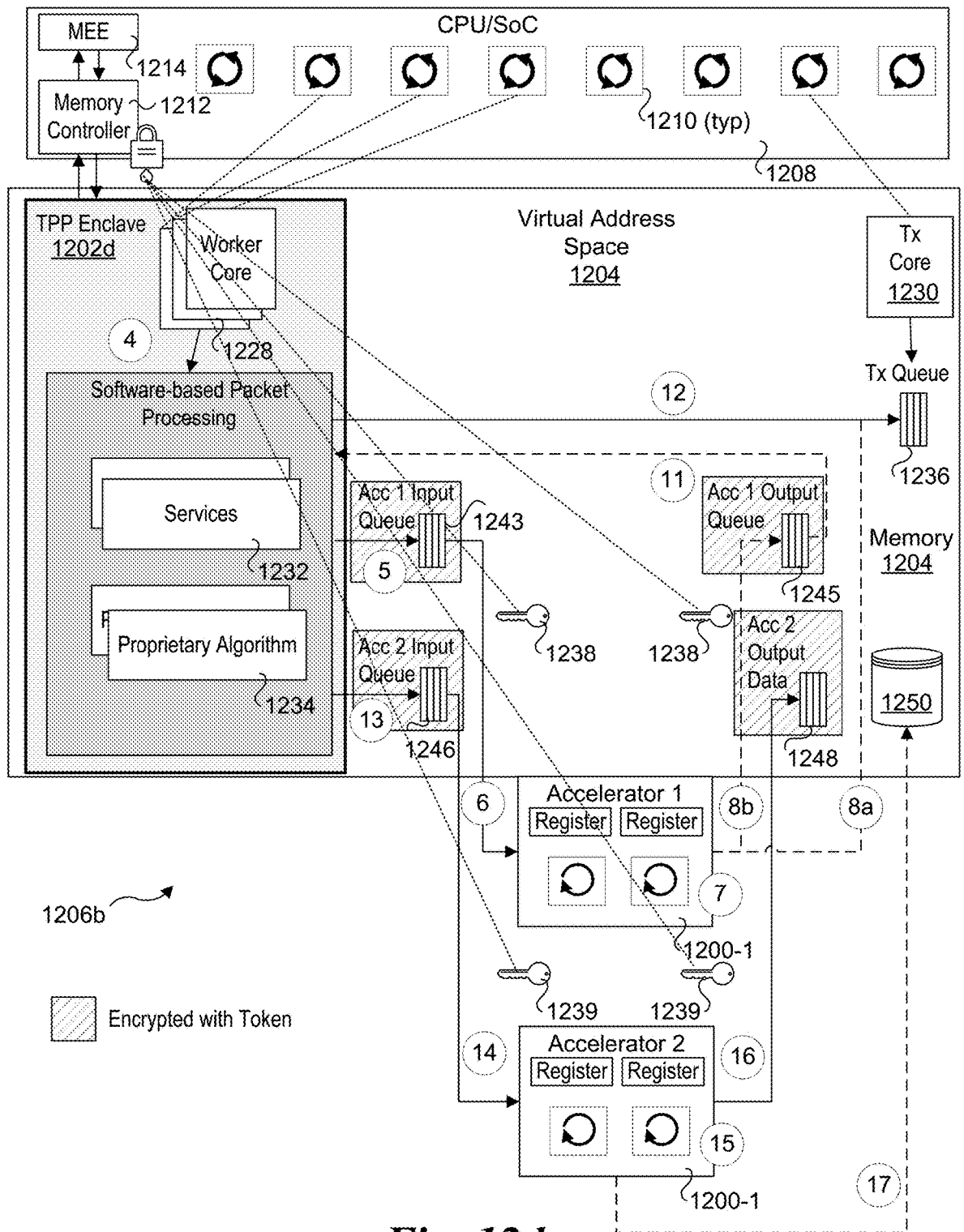
FIG. 12d is a schematic diagram illustrating a fifth example of packet processing under which multiple accelerators performs one or more services in parallel with software-based packet processing and/or following software-based packet processing and under which accelerator input and output queues are implemented in encrypted memory external to a secure enclave.

FIG. 12*d* shows a platform 1206*d* configured to employ multiple accelerators in parallel. In FIG. 12*d*, accelerator 1200 has been replaced by accelerator 1200-1, also labeled Accelerator 1. A second accelerator 1200-2 (Accelerator 2) has been added. Virtual address space 1204 now includes an Acc 1 input queue 1243, an Acc 2 input queue 1246, an Acc output queue 1245, and Acc 2 output data 1248, each containing encrypted data. During previous operations, the CSME will have generated tokens 1239 to enable accelerator 1200-2 to access memory in Acc 2 input queue 1246 and Acc 2 output data 1248, and provisioned the tokens to accelerator 1200-2 and memory controller 1212. Packet data that has been processed by software-based packet processing services 1232 are written to Acc 1 input queue 1243 and Acc 2 input queue 1246, as respectively depicted by operations 5 and 13. One or more services are offloaded to accelerators 1200-1 and 1200-2, which operate in parallel while asynchronously reading packet data (to be processed) from Acc 1 input queue 1243 and Acc 2 input queue 1246, respectively, as depicted by operations 6 and 14. The remainder of operations associated with accelerator 1200-1 are similar to those discussed above for accelerator 1200 of FIG. 12*b*.

Accelerator 1200-2 is used to perform one or more packet processing operation(s) 15 that results in generation of data related to the service it performs rather than processed packet data that is subsequently forwarded out a NIC Tx port. In one embodiment, the data generated by accelerator 1200-2 is written to Acc 2 output data 1248 that is encrypted, as depicted by operation 16. This data may be written into various types of data structures, such as a queue, a list, a vector, a table, etc. Optionally, the data generated by accelerator 1200-2 may be written into a data structure or repository that is in a portion of virtual address space 1204 that is not encrypted, as depicted by data 1250.

Figure 12E:
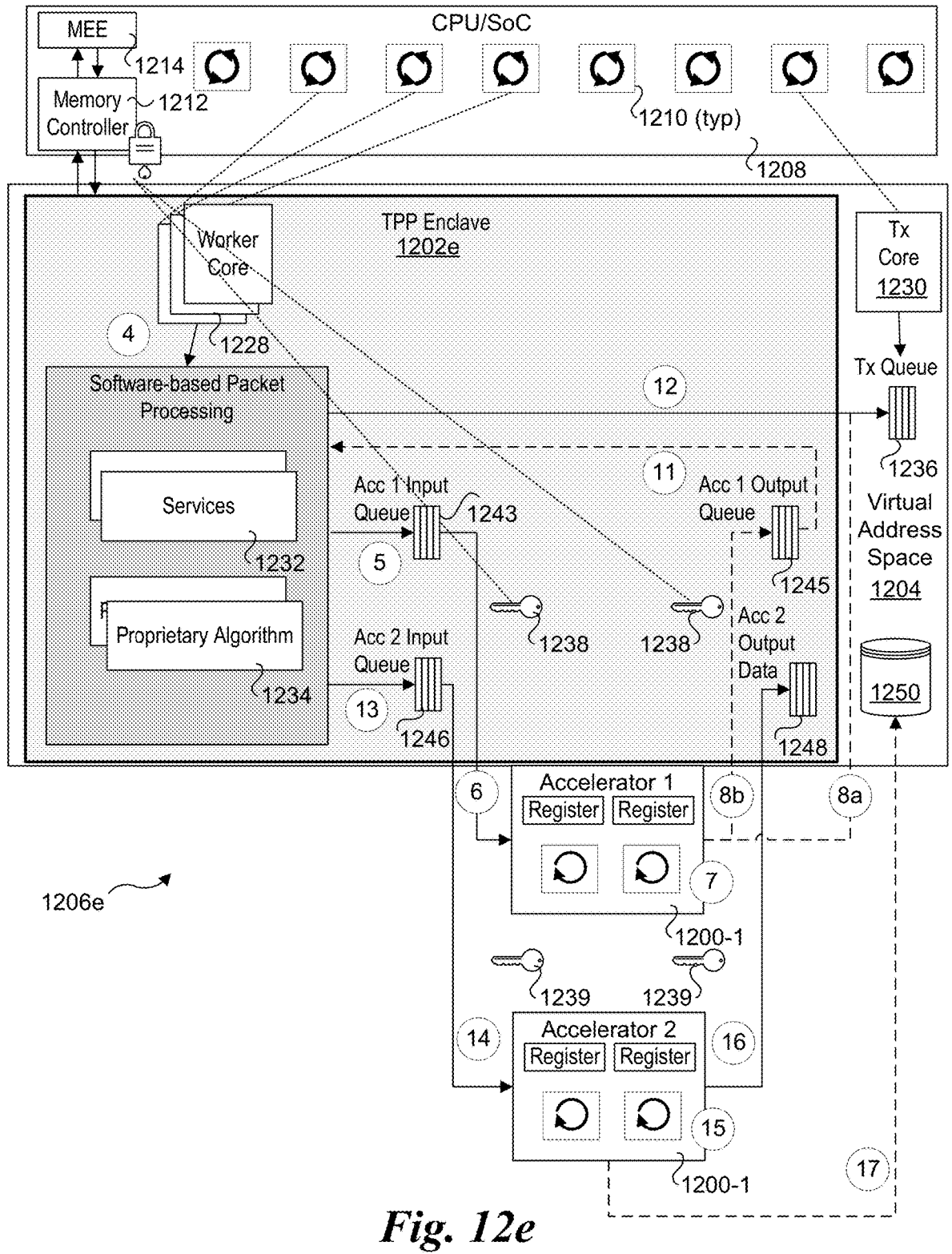
FIG. 12e is a schematic diagram illustrating a sixth example of packet processing under which multiple accelerators performs one or more services in parallel with software-based packet processing and/or following software-based packet processing and under which accelerator input and output queues are implemented a secure enclave.

FIG. 12*e* shows a platform 1206*e* configured to employ multiple accelerators in parallel. Platform 1206*e* is similar to platform 1206*d*, except that in platform 1206*e* each of Acc 1 input queue 1243, Acc 2 input queue 1246, Acc output queue 1245, and Acc 2 output data 1248 are located within TPP enclave 1202*e*. During previous operations, the CSME will have generated tokens 1239 to enable accelerator 1200-2 to access memory in TPP enclave 1202*e*, and provisioned the tokens to accelerator 1200-2 and memory controller 1212. In one embodiment, read and write memory access requests are performed using the operations and logic of flowcharts 1300*a* and 1400*a*, respectively.

In a manner similar to that shown in FIG. 12*b*, additional accelerators may be implemented in parallel. Moreover, additional accelerators may be implement for either performing standalone operations or part of a service chain before, in conjunction with, or after software-based packet processing operations are performed via execution of software in TPP enclave 1202*b*. It will be understood by those having skill in the art that multiple packet flows may be processed in parallel, which will generally include the use of many accelerator input and output queues; for simplicity and clarity, only a limited number of such accelerator input and output queues are shown in the figures herein.

Further aspects of the subject matter described herein are set out in the following numbered clauses:

1. A method comprising:
    creating at least one secure enclave in system memory of a compute platform including a processor, a network interface, and at least one hardware-based accelerator including a first accelerator, the compute platform configured to support a virtualized execution environment including a plurality of virtual machines (VMs) or containers, each secure enclave occupying a respective protected portion of the system memory, wherein software code external from a secure enclave cannot access code or data within a secure enclave, and software code in a secure enclave can access code and data both within the secure enclave and external to the secure enclave;
    installing software code for implementing software-based packet processing operations in the at least one secure enclave;
    performing packet processing for a plurality of packet flows corresponding to packets received at the network interface, wherein the packet processing for at least a portion of the plurality of packet flows includes a service chain comprising software-based packet processing performed via execution of software code in a secure enclave and at least one service performed by the first accelerator.

2. The method of clause 1, wherein packet processing for at least one packet flow includes accessing, via at least one of software running in a secure enclave or an accelerator, at least one of an input queue and an output queue located in a portion of encrypted memory external to the secure enclave 3. The method of clause 2, further comprising:
    employing a secure token to generate encrypted data prior to writing data to the portion of encrypted memory external to the secure enclave;
    writing the encrypted data, via a memory controller, to an input queue or output queue in the portion of encrypted memory external to the secure enclave;
    reading, via the memory controller in response to a memory read request issued by a requester, encrypted data from an input queue or output queue in the portion of encrypted memory external to the secure enclave, the encrypted data being returned to the requester; and employing the secure token to decrypt the encrypted data returned by the memory controller.

4. The method of clause 3, wherein the compute platform includes a trusted component and a memory controller coupled to the system memory, further comprising:
generating, via the trusted component, the secure token; and
provisioning the secure token to each of software running in the secure enclave, and the first accelerator.

5. The method of any of the preceding clauses, wherein packet processing for at least one packet flow includes accessing memory within a secure enclave via a memory access request issued by the one or more accelerators.

6. The method of clause 5, further comprising employing a secure token with each memory access request issued by the one or more accelerators to access memory within the secure enclave.

7. The method of clause 6, wherein the compute platform includes a trusted component and a memory controller coupled to the system memory, further comprising:
issuing, via the trusted component to each of the accelerator and the memory controller, a secure token to be included in each memory access request to memory within the secure enclave.

8. The method of clause 7, wherein the compute platform includes a plurality of accelerators, further comprising:
for each combination of a secure enclave and an accelerator used in a service chain,
provisioning a secure token to be included in each memory access request from the accelerator to the secure enclave.

9. The method of any of the preceding clauses, wherein a service chain includes:
a first set of one or more services performed via execution of software in the secure enclave; and
a second set of one or more services performed by the first accelerator.

10. The method of clause 9, wherein at least a portion of the first set of one or more services and the second set of one or more services is performed in parallel.

11. The method of clause 10, wherein the compute platform includes a plurality of accelerators including the first accelerator, and wherein the service chain further includes a third set of one or more services performed by a second accelerator.

12. The method of clause 11, wherein at least a portion of the second set of one or more services and the third set of one or more services is performed in parallel.

13. The method of any of the preceding clauses, wherein the first accelerator includes a plurality of registers, further comprising:
programming a first register with a first memory location of an input queue in which input data to be processed by the first accelerator is to be stored; and
programming a second register with a second memory location of an output queue in which output data produced by the first accelerator via processing the input data is to be stored.

14. The method of clause 13, further comprising:
enqueuing in the input queue, via software executing in a secure enclave, packet data to be processed by the first accelerator;
reading, via the accelerator, the packet data;
processing the packet data via the first accelerator, to produce processed packet data; and
writing the processed packet data to the output queue.

15. The method of any of the preceding clauses, wherein the at least one accelerator is embedded in the processor.

16. The method of any of the preceding clauses, wherein the compute platform further comprises an accelerator die, operatively coupled to the processor, on which the at least one accelerator is embedded.

17. The method of any of the preceding clauses, wherein the compute platform further comprises a plurality of expansion slots, operatively coupled to the processor, and wherein the first accelerator is implemented in an expansion card installed in one of the plurality of expansion slots.

18. A compute platform, comprising:
system memory;
a processor, operatively coupled to the system memory via a memory controller, having an instruction set including instructions for creating and providing access to secure enclaves implemented in the system memory, wherein software code external to a secure enclave cannot access code or data within a secure enclave, and software code in a secure enclave can access code and data both within the secure enclave and external to the secure enclave;
a first hardware-based accelerator; and
a plurality of network ports including one or more transmit (Tx) ports and one or more receive (Rx) ports, operatively coupled to the processor,
wherein, when operating, the computer platform hosts a virtualized execution environment including a plurality of virtual machines (VMs) or containers, wherein a plurality of secure enclaves are implemented in respective portions of system memory associated with at least one of the plurality of VMs or containers,
wherein software code for implementing packet processing operations is installed in the at least one secure enclave;
and wherein during operation of the compute platform the compute platform is configured to,
receive packets corresponding to a plurality of packet flows from a network at one or more Rx ports;
perform packet processing for a plurality of packet flows, wherein the packet processing for at least a portion of the plurality of packet flows includes a service chain comprising software-based packet processing performed via execution of software code in the at least one secure enclave and at least one service performed by the first accelerator; and
transmit packets for which packet processing has been completed outbound to the network via one or more of the Tx ports.

19. The compute platform of clause 18, wherein packet processing for at least one packet flow includes accessing, via at least one of software running in a secure enclave or via an accelerator, at least one of an input queue and an output queue located in a portion of encrypted memory external to the secure enclave.

20. The compute platform of clause 19, wherein during operation of the compute platform the compute platform is further configured to:
employ a secure token to generate encrypted data prior to writing data to the portion of encrypted memory external to the secure enclave;
write the encrypted data, via a memory controller, to an input queue or output queue in the portion of encrypted memory external to the secure enclave;
read, via the memory controller in response to a memory read request issued by a requester, encrypted data from an input queue or output queue in the portion of encrypted memory external to the secure enclave, the encrypted data being returned to the requester; and employ the secure token to decrypt the encrypted data returned by the memory controller.

21. The compute platform of clause 20, wherein the compute platform includes a trusted component and a memory controller coupled to the system memory, and wherein during operation of the compute platform the compute platform is further configured to:

generate, via the trusted component, the secure token; and provision the secure token to each of software running in the secure enclave, the accelerator, and the memory controller.

22. The compute platform of any of clauses 18-21, wherein packet processing for at least one packet flow includes accessing memory within a secure enclave via a memory access request issued by the one or more accelerators.

23. The compute platform of clause 22, wherein during operation of the compute platform the compute platform is further configured to employ a secure token with each memory access request issued by the one or more accelerators to access memory within the secure enclave.

24. The compute platform of clause 23, wherein the compute platform includes a trusted component and a memory controller coupled to the system memory, wherein during operation of the compute platform the compute platform is further configured to issue, via the trusted component to each of the accelerator and the memory controller, a secure token to be included in each memory access request to memory within the secure enclave.

25. The compute platform of clause 23, wherein the compute platform includes a plurality of accelerators, wherein during operation of the compute platform the compute platform is further configured to:

for each combination of a secure enclave and an accelerator used in a service chain, provision a secure token to be included in each memory access request from the accelerator to the secure enclave.

26. The compute platform of any of clauses 18-25, wherein a service chain includes:

a first set of one or more services performed via execution of software in the secure enclave; and a second set of one or more services performed by the first accelerator.

27. The compute platform of clause 26, wherein at least a portion of the first set of one or more services and the second set of one or more services is performed in parallel.

28. The compute platform of clause 27, wherein the compute platform includes a plurality of accelerators including the first accelerator, and wherein the service chain further includes a third set of one or more services performed by a second accelerator.

29. The compute platform of clause 28, wherein at least a portion of the second set of one or more services and the third set of one or more services is performed in parallel.

30. The compute platform of any of clauses 18-29, wherein the first accelerator includes a plurality of registers, further comprising:

a first register storing a first memory location of an input queue from which input data to be processed by the first accelerator is to be read; and a second register storing a second memory location of an output queue in which output data produced by the first accelerator via processing the input data is to be written.

31. The compute platform of clause 30, wherein during operation of the compute platform the compute platform is further configured to:

enqueue in the input queue, via software executing in a secure enclave, packet data to be processed by the first accelerator;

read, via the accelerator, the packet data;

process the packet data via the first accelerator, to produce processed packet data; and write the processed packet data to the output queue.

32. The compute platform of any of clauses 18-31, wherein the at least one accelerator is embedded in the processor.

33. The compute platform of any of clauses 18-31, further comprising an accelerator die, operatively coupled to the processor, on which the at least one accelerator is embedded.

34. The compute platform of any of clauses 18-31, further comprising a plurality of expansion slots, operatively coupled to the processor, wherein the first accelerator is implemented in an expansion card installed in one of the plurality of expansion slots.

35. A processor, comprising:

a plurality of processing cores;

a memory controller, operatively coupled to the plurality of processors via an interconnect, configured to control access to system memory when installed in a compute platform including the system memory;

a memory encryption engine (MEE), coupled to the memory controller, configured to perform encryption and decryption operations;

a plurality of accelerators, operatively coupled to the memory controller via the interconnect, at least one accelerator including a plurality of registers and firmware to configured to be executed by that accelerator;

wherein at least one processor core has an instruction set including instructions for creating and providing access to secure enclaves implemented in the system memory, wherein software code external to a secure enclave cannot access code or data within a secure enclave, and software code in a secure enclave can access code and data both within the secure enclave and external to the secure enclave, and wherein the instruction set further includes instructions to enable the processor to be programmed to enable at least one of the plurality of accelerators to perform read and write accesses to an encrypted portion of memory.

36. The processor of clause 35, wherein the encrypted portion of memory is in a virtual address space that is not contained within a secure enclave.

37. The processor of clause 36, wherein data in a first encrypted portion of memory is encrypted and decrypted using a token that is provisioned to a first accelerator, and wherein the first accelerator further includes firmware that is configured, upon execution and when the processor is installed in the compute platform, to use the token to:

encrypt data to be written to the first encrypted portion of memory, and decrypt encrypted data that is returned to the first accelerator by the memory controller in response to a memory read request requesting data to be read from the first encrypted portion of memory.

38. The processor of clause 37, further comprising a trusted computing base (TCB) component that is operatively coupled to the memory controller and the plurality of accelerators, wherein the TCB component is configured to provision the first token to the first accelerator.

39. The processor of clause 38, wherein the TCB component is further configured to provision the token to software running in a secure enclave, wherein the token enables the software running in the secure enclave to:
  encrypt data to be written to the first encrypted portion of memory; and
  decrypt encrypted data that is returned to the software by the memory controller in response to a memory read request requesting data to be read from the first encrypted portion of memory.

40. The processor of any of clauses 35-39, wherein the encrypted portion of memory is contained within a secure enclave.

41. The processor of clause 40, wherein at least one of the memory controller and the MEE includes logic to enable access to memory within a secure enclave via a token that is submitted with each memory access request to a memory address within the secure enclave, wherein for a memory read request or a memory write request the token is used to validate the memory read request or memory write request and deny the request if the token is invalid.

42. The processor of clause 41, further comprising a trusted computing base (TCB) component that is operatively coupled to the memory controller and the plurality of accelerators, wherein the TCB component is configured to provision a token to an accelerator and to the memory controller that is to be used by the accelerator to access memory within a secure enclave.

43. The processor of any of clauses 35-42, wherein at least one of the plurality of accelerators includes a plurality of registers, and wherein that accelerator further includes firmware that is configured, upon execution and when the processor is installed in the compute platform, to,
  read data via one or more memory read requests issued to the memory controller from an input queue having a first location in a virtual memory address space for the system memory identified by a first address written to a first register;
  perform one or more processing operations on the data; and
  write data that has been processed to an output queue having a second location in a virtual memory address space for the system memory identified by a second address written to a second register via one or more memory write requests issued to the memory controller.

44. The processor of any of clauses 35-43, wherein at least one of the plurality of the accelerators is a fixed-function accelerator.

45. The processor of any of clauses 35-43, wherein at least one of the plurality of the accelerators is a programmable accelerator.

46. The processor of any of clauses 35-43, wherein one of the plurality of accelerators is configured to perform Internet Protocol Security (IPSec) packet processing service.

47. The processor of any of clauses 35-43, wherein one of the plurality of accelerators is a Graphics Processing Unit (GPU) that includes firmware that is configured, upon execution by the GPU, to perform at least one packet processing service.

48. The processor of any of clauses 35-43, wherein one of the plurality of accelerators is a Field Programmable Gate Array (FPGA).

49. The processor of any of clauses 35-43, wherein one of the plurality of accelerators is an encryption/decryption unit.

50. The processor of any of clauses 35-43, wherein one of the plurality of accelerators is configured to perform machine learning by processing packet data received by the compute platform when the processor is installed in the compute platform and the compute platform is operating.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
creating at least one secure enclave in system memory of a compute platform including a processor, a network interface, and at least one hardware-based accelerator including a first accelerator, the compute platform configured to support a virtualized execution environment including a plurality of virtual machines (VMs) or containers, each secure enclave occupying a respective protected portion of the system memory, wherein software code external from a secure enclave cannot access code or data within a secure enclave, and software code in a secure enclave can access code and data both within the secure enclave and external to the secure enclave;
installing software code for implementing software-based packet processing operations in the at least one secure enclave;
performing packet processing for a plurality of packet flows corresponding to packets received at the network interface, wherein the packet processing for at least a portion of the plurality of packet flows includes a service chain comprising software-based packet processing performed via execution of software code in a secure enclave and at least one service performed by the first accelerator.

2. The method of claim 1, wherein packet processing for at least one packet flow includes accessing, via at least one of software running in a secure enclave or an accelerator, at least one of an input queue and an output queue located in a portion of encrypted memory external to the secure enclave.

3. The method of claim 2, further comprising:
employing a secure token to generate encrypted data prior to writing data to the portion of encrypted memory external to the secure enclave;
writing the encrypted data, via a memory controller, to an input queue or output queue in the portion of encrypted memory external to the secure enclave;
reading, via the memory controller in response to a memory read request issued by a requester, encrypted data from an input queue or output queue in the portion of encrypted memory external to the secure enclave, the encrypted data being returned to the requester; and
employing the secure token to decrypt the encrypted data returned by the memory controller.

4. The method of claim 3, wherein the compute platform includes a trusted component and a memory controller coupled to the system memory, further comprising:
generating, via the trusted component, the secure token; and
provisioning the secure token to each of software running in the secure enclave, and the first accelerator.

5. The method of claim 1, wherein packet processing for at least one packet flow includes accessing memory within a secure enclave via a memory access request issued by the one or more accelerators.

6. The method of claim 5, further comprising employing a secure token with each memory access request issued by the one or more accelerators to access memory within the secure enclave.

7. The method of claim 6, wherein the compute platform includes a trusted component and a memory controller coupled to the system memory, further comprising:
issuing, via the trusted component to each of the accelerator and the memory controller, a secure token to be included in each memory access request to memory within the secure enclave.

8. The method of claim 7, wherein the compute platform includes a plurality of accelerators, further comprising:
for each combination of a secure enclave and an accelerator used in a service chain,
provisioning a secure token to be included in each memory access request from the accelerator to the secure enclave.

9. The method of claim 1, wherein a service chain includes:

a first set of one or more services performed via execution of software in the secure enclave; and a second set of one or more services performed by the first accelerator.

10. The method of claim 9, wherein at least a portion of the first set of one or more services and the second set of one or more services is performed in parallel.

11. The method of claim 1, wherein the first accelerator includes a plurality of registers, further comprising:

programming a first register with a first memory location of an input queue in which input data to be processed by the first accelerator is to be stored; and programming a second register with a second memory location of an output queue in which output data produced by the first accelerator via processing the input data is to be stored.

12. The method of claim 11, further comprising:

enqueuing in the input queue, via software executing in a secure enclave, packet data to be processed by the first accelerator;

reading, via the accelerator, the packet data;

processing the packet data via the first accelerator, to produce processed packet data; and writing the processed packet data to the output queue.

* * * * *